United States Patent
Sakane et al.

(10) Patent No.: US 7,443,094 B2
(45) Date of Patent: Oct. 28, 2008

(54) PHOSPHOR AND MANUFACTURING METHOD OF THE SAME, AND LIGHT EMITTING DEVICE USING THE PHOSPHOR

(75) Inventors: Kenji Sakane, Tokyo (JP); Akira Nagatomi, Tokyo (JP)

(73) Assignee: DOWA Electronics Materials Co., Ltd., Tokyo (JP)

( * ) Notice: Subject to any disclaimer, the term of this patent is extended or adjusted under 35 U.S.C. 154(b) by 579 days.

(21) Appl. No.: 11/149,192

(22) Filed: Jun. 10, 2005

(65) Prior Publication Data

US 2006/0220520 A1 Oct. 5, 2006

(30) Foreign Application Priority Data

Mar. 31, 2005 (JP) ............... 2005-102427

(51) Int. Cl.
*H01J 1/62* (2006.01)
*H01J 63/04* (2006.01)

(52) U.S. Cl. ............ 313/503; 313/498; 257/98; 252/301.4 F; 252/301.4 R

(58) Field of Classification Search .......... 313/498, 313/502–504, 512; 257/98–100; 252/301.4 R, 252/301.4 F
See application file for complete search history.

(56) References Cited

U.S. PATENT DOCUMENTS

| | | | |
|---|---|---|---|
| 18,985 A | 12/1857 | Olds | |
| 2,121,275 A | 6/1938 | Zober et al. | |
| 3,527,595 A | 9/1970 | Adler et al. | |
| 3,697,301 A | 10/1972 | Donofrio et al. | |
| 4,477,689 A | 10/1984 | Ogasahara et al. | |
| 4,576,736 A | 3/1986 | Harmuth | |
| 5,398,398 A | 3/1995 | Williams et al. | |
| 5,447,291 A | 9/1995 | Sandhage | |
| 5,600,202 A | 2/1997 | Yamada et al. | |
| 6,180,029 B1 | 1/2001 | Hampden-Smith et al. | |
| 6,504,297 B1 | 1/2003 | Heo et al. | |
| 6,670,748 B2 | 12/2003 | Ellens et al. | |
| 7,138,756 B2 | 11/2006 | Gotoh et al. | |
| 7,273,568 B2 * | 9/2007 | Nagatomi et al. | 252/301.4 F |
| 2002/0043926 A1 | 4/2002 | Takahashi et al. | |
| 2003/0030038 A1 | 2/2003 | Mitomo et al. | |
| 2003/0030368 A1 | 2/2003 | Ellens et al. | |

(Continued)

FOREIGN PATENT DOCUMENTS

EP  0 459 156 A2  4/1991

(Continued)

OTHER PUBLICATIONS

U.S. Appl. No. 11/194,590, filed Aug. 2, 2005.

(Continued)

*Primary Examiner*—Karabi Guharay
*Assistant Examiner*—Kevin Quarterman
(74) *Attorney, Agent, or Firm*—Oliff & Berridge, PLC

(57) ABSTRACT

A phosphor having an emission spectrum with a broad peak in a range of blue color and a broad and flat excitation band in a range of near ultraviolet/ultraviolet, and having an excellent emission efficiency and emission intensity/luminance, a manufacturing method of the same, and a light emitting device using the phosphor. The phosphor has a general composition formula expressed by MmAaBbOoNn:Z.

16 Claims, 10 Drawing Sheets

U.S. PATENT DOCUMENTS

| | | |
|---|---|---|
| 2003/0094893 A1 | 5/2003 | Ellens et al. |
| 2003/0132422 A1 | 7/2003 | Tian et al. |
| 2003/0152804 A1 | 8/2003 | Miura et al. |
| 2003/0213611 A1 | 11/2003 | Morita |
| 2004/0155225 A1 | 8/2004 | Yamada et al. |
| 2004/0263074 A1 | 12/2004 | Baroky et al. |
| 2005/0001225 A1 | 1/2005 | Yoshimura et al. |
| 2005/0189863 A1 | 9/2005 | Nagatomi et al. |
| 2005/0203845 A1 | 9/2005 | Yoshimine et al. |
| 2005/0205845 A1 | 9/2005 | Deising et al. |
| 2005/0253500 A1 | 11/2005 | Gotoh et al. |
| 2005/0267243 A1 | 12/2005 | Amasaki et al. |
| 2006/0006782 A1 | 1/2006 | Nagatomi et al. |
| 2006/0017365 A1 | 1/2006 | Nagatomi et al. |
| 2006/0021788 A1 | 2/2006 | Kohayashi et al. |
| 2006/0022573 A1 | 2/2006 | Gotoh et al. |
| 2006/0033083 A1 | 2/2006 | Sakane et al. |
| 2006/0043337 A1 | 3/2006 | Sakane et al. |
| 2006/0045832 A1 | 3/2006 | Nagatomi et al. |
| 2006/0065878 A1 | 3/2006 | Sakane et al. |
| 2006/0076883 A1 | 4/2006 | Himaki et al. |
| 2006/0091790 A1 | 5/2006 | Nagatomi et al. |
| 2006/0170332 A1 | 8/2006 | Tamaki et al. |
| 2006/0197432 A1 | 9/2006 | Nagatomi et al. |
| 2006/0197439 A1 | 9/2006 | Sakane et al. |
| 2006/0220047 A1 | 10/2006 | Nagatomi et al. |
| 2006/0220520 A1 | 10/2006 | Sakane et al. |
| 2006/0244356 A1 | 11/2006 | Nagatomi et al. |
| 2007/0007494 A1 | 1/2007 | Hirosaki et al. |
| 2007/0029525 A1 | 2/2007 | Gotoh et al. |
| 2007/0164308 A1 | 7/2007 | Yoshimura et al. |

FOREIGN PATENT DOCUMENTS

| | | |
|---|---|---|
| EP | 1 296 376 A2 | 3/2003 |
| EP | 1 445 295 A1 | 8/2004 |
| JP | 05-015655 | 1/1993 |
| JP | 05-198433 | 8/1993 |
| JP | 11-144938 | 5/1999 |
| JP | 11-277527 | 10/1999 |
| JP | 2000-073053 | 3/2000 |
| JP | 2000-153167 | 6/2000 |
| JP | 2001-214162 | 8/2001 |
| JP | 2002-363554 | 12/2002 |
| JP | 2003-013059 | 1/2003 |
| JP | 2003-124527 | 4/2003 |
| JP | A 2003-096446 | 4/2003 |
| JP | 2003-515655 | 7/2003 |
| JP | 2003-277746 | 10/2003 |
| JP | 2003-336059 | 11/2003 |
| JP | 2004-055910 | 2/2004 |
| JP | 2004-505470 | 2/2004 |
| JP | 2004-067837 | 3/2004 |
| JP | 2004-145718 | 5/2004 |
| JP | 2004-166058 | 6/2004 |
| JP | 2004-189997 | 7/2004 |
| JP | 2004-207271 | 7/2004 |
| JP | A-2004-186278 | 7/2004 |
| JP | 2004-235598 | 8/2004 |
| JP | 2004-248405 | 8/2004 |
| JP | 2004-250920 | 8/2004 |
| JP | 2004-253312 | 8/2004 |
| JP | 2004-244560 | 9/2004 |
| JP | 2004-055536 | 12/2004 |
| JP | 2004-368153 | 12/2004 |
| JP | 2005-075854 | 3/2005 |
| JP | 2005-103429 | 3/2005 |
| JP | 2005-105126 | 3/2005 |
| JP | 2005-192691 | 6/2005 |
| JP | 2005-344025 | 12/2005 |
| JP | 2006-028295 | 2/2006 |
| JP | 2006-063214 | 3/2006 |
| JP | 2006-063286 | 3/2006 |
| JP | 2006-070109 | 3/2006 |
| JP | 2006-176546 | 7/2006 |
| JP | A-2006-282809 | 10/2006 |
| JP | A-2006-282872 | 10/2006 |
| WO | WO 01/40403 A1 | 6/2001 |
| WO | WO 02/11214 A1 | 2/2002 |
| WO | WO 2004/030109 A1 | 4/2004 |
| WO | WO 2004/039915 A1 | 5/2004 |
| WO | WO 2004/055910 A1 | 7/2004 |
| WO | WO 2005/052087 A1 | 6/2005 |
| WO | WO 2006/093298 | 9/2006 |

OTHER PUBLICATIONS

U.S. Appl. No. 10/984,772, filed Nov. 10, 2004, Nagatomi et al.
U.S. Appl. No. 11/061,669, filed Feb. 22, 2005, Nagatomi et al.
U.S. Appl. No. 11/063,847, filed Feb. 23, 2005, Sakane et al.
U.S. Appl. No. 11/149,317, filed Jun. 10, 2005, Nagatomi et al.
U. S. Appl. No. 11/198,281, filed Aug. 8, 2005, Nagatomi et al.
U.S. Appl. No. 11/194,590, filed Aug. 2, 2005, Gotoh et al.
U.S. Appl. No. 11/211,751, filed Aug. 26, 2005, Sakane et al.
U.S. Appl. No. 11/218,504, filed Sep. 6, 2005, Nagatomi et al.
Jis Z 8726; "Method of Specifying Colour Rendering Properties of Light Sources"; (1990), pp. 381-390.
"Phosphor Handbook"; (compiled by Phosphor Research Society, published by Ohmusha, Ltd., 1987); pp. 172-176.
K. Uheda et al., "The Crystal Structure and Photoluminescence Properties of a New Red Phosphor, Calcium Aluminum Silicon Nitride Doped With Divalent Euroium," Abs. 2073, 206th Meeting., Oct. 3, 2004.

* cited by examiner (A)

(B)

(C)

PHOSPHOR AND MANUFACTURING METHOD OF THE SAME, AND LIGHT EMITTING DEVICE USING THE PHOSPHOR

TECHNICAL FIELD OF THE INVENTION

The present invention relates to a phosphor containing nitrogen used for a cathode-ray tube (CRT), a display such as a field emission display (FED) and a plasma display (PDP), and an illumination device such as a fluorescent lamp and a fluorescent display tube, and an illumination device such as a back light for liquid-crystal display and a method of manufacturing therefore, and also to a light emitting device such as a white LED illumination in which a semiconductor light emitting element (LED) and the phosphor are combined.

BACKGROUND OF THE INVENTION

At present, a discharge type fluorescent lamp and an incandescent bulb used as the illumination device involve problems that a harmful substance such as mercury is contained, and life span is short. However, in recent years, a high luminescence LED emitting light of near ultraviolet/ultraviolet to blue color has been developed in sequence, and the white LED illumination for the practical application of the next generation has been actively studied and developed, in which the white light is prepared by mixing the light of the near ultraviolet/ultraviolet to blue color generated from the LED and the light generated from the phosphor having an excitation band in a wavelength region thereof. When the white LED illumination is put to practical use, since efficiency of converting electric energy into light is improved, less heat is generated and it is constituted of the LED and a phosphor, the white LED has advantages of good life span without burn-out of a filament as is seen in a conventional incandescent bulb and the harmful substance such as mercury is not contained, and miniaturization of the illumination device is realized, thus realizing an ideal illumination device.

A white LED illumination system creating white light by combining the high luminance LED and the phosphor is called one chip system. This one chip system has an advantage that it has excellent color rendering properties and can be manufactured at a low cost, compared to a multi-chip type system which creates white color by using three primary color LEDs such as high luminance red LED, green LED, and blue LED, and is focused as an illumination of the next generation.

As the white LED illumination of the one chip system, there is one that combines the high luminance blue LED and the phosphor emitting yellow light under an excitation of blue emitting light generated from the LED, and for example, which is obtained by combining the high luminance blue LED, in which an InGaN material is used, and garnet yellow phosphors such as $(Y, Gd)_3(Al, Ga)_5O_{12}$:Ce(YAG:Ce), $Tb_3Al_5O_{12}$:Ce, and $Ca_3Sc_2Si_3O_{12}$:Ce. In the white LED illumination, white color is obtained by using a complementary relation between blue emission of the LED and yellow emission of the phosphor. However, the problem of the white LED illumination is that the emission on the long-wavelength side of visible light range, specifically the emission of red color component is insufficient although the white LED illumination has a high luminance, thereby deteriorating in the color rendering properties which are essential factors of illumination. However, in recent years, the phosphor having an excitation spectrum with a peak in the wavelength range from yellow color to red color, and having an emission spectrum with a peak in a broad range, and also having a good excitation band in a range from near ultraviolet/ultraviolet to blue color, and having nitrogen has been developed in sequence. Then, by adding such a phosphor, the color rendering properties are improved. As such phosphors containing nitrogen, $Ca_2Si_5N_8$:Eu, $Sr_2Si_5N_8$:Eu, $Ba_2Si_5N_8$: Eu, $Ca_x(Al, Si)_{12}(O, N)_{16}$:Eu (0<x≦1.5), $CaAl_2Si_4N_8$: Eu, $CaSiN_2$:Eu, $CaAlSiN_3$:Eu are typically given as examples.

However, problems are involved in the white LED illumination, in which the high luminance blue LED and the garnet yellow phosphor are combined, such that the garnet yellow phosphor does not have a flat broad excitation band near the excitation wavelength of 460 nm, there are variances in the emission intensity and the peak wavelength of the high luminance blue LED, and a balance of the emission intensity of blue color and yellow color is lost, thereby changing a color tone of the white light, because the emission intensity of transmitted blue light depending on a film thickness is changed when the phosphor is applied on the LED.

In order to solve the above-described problem, at present, a white LED illumination system is actively studied. In such a white LED illumination system, white color is obtained by using the light in a mixed state of the near ultraviolet/ultraviolet emitting LED and the red (R) color emitting phosphor, the green (G) color emitting phosphor, and the blue (B) color emitting phosphor obtained by being excited by the light of the near ultraviolet/ultraviolet light generated from the LED. This system has an advantage that an arbitrary emission color can be obtained in addition to white light by the combination of the R, G, B, and the mixing ratio, white emission is obtained not by the complementary relation of light but by the mixing state of light, and by using the R, G, B and other phosphors having broad emission spectra, the emission spectrum which is approximated the spectrum of the sun-light is obtained compared to the white LED obtained by combining the high luminance blue LED and the garnet yellow phosphor, and the color rendering properties are possibly improved. Further, even when there is a variance in the emission intensity and the peak wavelength as is seen in the high luminance blue LED, a phenomenon of changing the color tone of the white light does not occur, because the near ultraviolet/ultraviolet light is not used in the mixing state of the light. In addition, even when the phosphor is applied on the near ultraviolet/ultraviolet LED, the change of the emission intensity of the near ultraviolet/ultraviolet light transmitting therethrough has no influence on the color tone, and therefore the white LED illumination with excellent color rendering properties and small in variance of the color tone can be prepared.

Then, as the phosphor used for such an application, examples are given such as $Y_2O_2S$:Eu, $La_2O_2S$:Eu, $3.5MgO.0.5MgF_2.GeO_2$:Mn, $(La, Mn, Sm)_2O_2S.Ga_2O_3$:Eu for the red phosphor, $ZnS$:Cu,Al, $CaGa_2S_4$:Eu, $SrGa_2S_4$:Eu, $BaGa_2S_4$:Eu, $SrAl_2O_4$:Eu, BAM:Eu,Mn, $Ba_2SiO_4$:Eu for the green phosphor, and BAM:Eu, $Sr_5(PO_4)_3Cl$:Eu, ZnS:Ag, $(Sr, Ca, Ba, Mg)_{10}(PO_4)_6Cl_2$:Eu for the blue phosphor. In the phosphor containing nitrogen as described above, $Ca_2Si_5N_8$: Eu, $Sr_2Si_5N_8$:Eu, $Ba_2Si_5N_8$:Eu, $Ca_x(Al, Si)_{12}(O, N)_{16}$:Eu (0<x≦1.5), $CaAl_2Si_4N_8$:Eu, $CaSiN_2$:Eu, $CaAlSiN_3$:Eu and so forth have emission spectra with high efficient excitation band even in the near ultraviolet/ultraviolet and broad peaks, and therefore have improved luminance and color rendering properties even in the white LED illumination obtained by combining the near ultraviolet/ultraviolet LED and the R, G, B and other phosphor. However, there is no high efficient and high luminance R, G, B and other phosphor such as the YAG:Ce phosphor used in combination with the high luminance blue LED and the garnet yellow phosphor, and therefore a satisfactory white LED illumination can not be obtained.

Therefore, in regards to the phosphor of each color, a new phosphor having an excellent emission characteristic has been developed, and in regards to the blue phosphor also, a new blue phosphor surpassing the present BAM:Eu, $Sr_5(PO_4)_3Cl$:Eu, ZnS:Ag, $(Sr, Ca, Ba, Mg)_{10}(PO_4)_6Cl_2$: Eu has been actively developed. In recent years, nitrogen-containing $La_{1-x}Si_3N_5$:xCe (for example, see patent document 1) is reported.

(Patent document 1) Japanese Patent Laid-Open No.2003-96446

However, although the nitrogen-containing phosphor of the aforementioned patent document 1 has the emission spectrum with a broad peak, the emission intensity under the excitation of the excitation light of near ultraviolet/ultraviolet does not meet a satisfactory level, and therefore a sufficient emission intensity and luminance can not be obtained. Thus, the phosphor of the patent document 1 is considered to be inadequate to be used in the light emitting device.

In view of the above-described problems, the present invention is provided, and an object of the present invention is to provide a phosphor having a broad emission spectrum in a range of blue color (in a peak wavelength range from 400 nm to 500 nm), having a flat broad excitation band in the range of the near ultraviolet/ultraviolet, and having an excellent emission efficiency, emission intensity, and luminance, a method of manufacturing therefore, and a light emitting device such as white LED illumination using the phosphor.

SUMMARY OF THE INVENTION

In order to solve the above-described problem, after studying on a phosphors of various kinds of composition containing nitrogen, it was found that a new blue phosphor containing nitrogen expressed by the following general composition formula is obtained, by optimizing a constituent element, the molar ratio of the constituent element, and firing conditions.

Then, the present invention takes several aspects as follows.

In a first aspect, a phosphor is provided, which is given as a general composition formula expressed by MmAaBbOoNn:Z, (where element M is the element having bivalent valency, element A is the element having tervalent valency, element B is the element having tetravalent valency, O is oxygen, N is nitrogen, and element Z is one or more kind of element acting as an activator.), satisfying $5.0<(a+b)/m<9.0$, $0 \leq a/m \leq 2.0$, $0 \leq o<n$, $n=(2/3)m+a+(4/3)b-(2/3)o$, and having an emission spectrum with a maximum peak wavelength from 400 nm to 500 nm under an excitation of the light in a wavelength range from 350 nm to 430 nm.

In a second aspect, the phosphor according to the first aspect is provided, which is given as the composition formula expressed by $0.0<a/m \leq 2.0$, $4.0 \leq b/m \leq 8.0$, $0<o/m \leq 3.0$.

In a third aspect, the phosphor according to either of the first or second aspect is provided, wherein the element M is one or more kind of element selected from a group consisting of Mg, Ca, Sr, Ba, and Zn, and rare earth elements having bivalent valency, element A is one or more kind of element selected from a group consisting of Al, Ga, In, Tl, Y, Sc, P, As, Sb, and Bi, element B is one or more kind of element selected from the group consisting of Si, Ge, Sn, Ti, Hf, Mo, W, Cr, Pb, and Zr, and element Z is more than one kind of element selected from the group consisting of the rare earth elements and transition metal elements.

In a fourth aspect, the phosphor according to any one of the first to third aspects is provided, wherein the element M is one or more kind of element selected from a group consisting of Mg, Ca, Sr, Ba, and Zn, the element A is one or more kind of element selected from a group consisting of Al, Ga, and In, the element B is Si and/or Ge, and the element Z is one or more kind of element selected from the group consisting of Eu, Ce, Pr, Tb, Yb, and Mn.

In a fifth aspect, the phosphor according to any one of the first to fourth aspects is provided, wherein the element M is Sr, the element A is Al, the element B is Si, and the element Z is Eu.

In a sixth aspect, the phosphor according to any one of the first to fifth aspects is provided, wherein when the general formula is expressed by MmAaBbOoNn:Zz, the value of $z/(m+z)$, which is a molar ratio of the element M to the element Z, is not less than 0.0001 and not more than 0.5.

In a seventh aspect, the phosphor according to any one of the first to sixth aspects is provided, containing Sr of 16.0 to 25.0 wt %, Al of 2.0 to 9.0 wt %, Si of 34.5 to 44.5 wt %, o of 0.5 to 11.5 wt %, N of 23.0 to 32.0 wt %, and Eu of 0 to 3.5 wt %, having an emission spectrum with a maximum peak wavelength in a range from 400 to 500 nm under an excitation of the light in a wavelength range from 350 nm to 430 nm.

In an eighth aspect, the phosphor according to any one of the first to seventh aspects is provided, wherein in an X-ray diffraction pattern by a powder method using CoKα ray, a diffraction peak with highest intensity is shown in a Bragg angle (2θ) range from 35° to 37°, and further in the Bragg angle (2θ) range from 23.6° to 25.6°, 33° to 35°, 39.7° to 40.7°, and 43° to 44° of an X-ray diffraction pattern by the powder method, two, two, one, and one characteristic diffraction peaks are shown, respectively and when a relative intensity of the diffraction peak with highest intensity observed in the Bragg angle (2θ) range from 35° to 37° is defined as 100%, the relative intensity of the diffraction peaks is not less than 2.0%, and not more than 40%.

In a ninth aspect, the phosphor according to any one of the first to eighth aspects is provided, wherein the phosphor is in a powdery state.

In a tenth aspect, the phosphor according to the ninth aspect is provided, containing primary particles having particle size of 20 μm or less, and an aggregate in which the primary particles are aggregated each other, wherein an average particle size (D50) of a phosphor powder containing the primary particles and the aggregate is not less than 1.0 μm and not more than 20.0 μm.

In an eleventh aspect, a manufacturing method of the phosphor according to any one of the first to tenth aspects is provided, wherein by using a crucible composed of nitride as a firing crucible, raw materials are fired at temperature of not less than 1600° C. and not more than 2000° C., with one or more kind of gas selected from nitrogen gas, rare gas, and ammonia gas being kept flowing in a furnace at 0.1 ml/min or more.

In a twelfth aspect, the manufacturing method of the phosphor according to eleventh aspect is provided, wherein the raw materials are fired with pressure in the furnace set at 0.5 MPa or less.

In a thirteenth aspect, the manufacturing method of the phosphor according to either of the eleventh or twelfth aspect is provided, wherein the crucible composed of nitrogen is a BN crucible.

In a fourteenth aspect, the manufacturing method of the phosphor according to any one of the eleventh to thirteenth aspects is provided, wherein carbonate is used as a raw material of an element M.

In a fifteenth aspect, a light emitting device is provided, having the phosphor according to any one of the first to tenth aspects and a light emitting part emitting light of a first wavelength and emitting the light from the phosphor having different wavelength from that of the first wavelength, with a part of or all of the light of the first wavelength as an excitation light.

In a sixteenth aspect, the light emitting device according to the fifteenth aspect is provided, wherein the first wavelength is in a range from 350 nm to 430 nm.

In a seventeenth aspect, the light emitting device according to either of the fifteenth or sixteenth aspect is provided, wherein the light emitting part emitting the light of the first wavelength is a light emitting device (LED).

According to the phosphor of any one of the first to eighth aspects, the phosphor having the excellent emission efficiency, emission intensity and luminance is provided, having the emission spectrum with a high efficient excitation band in the wavelength range of the near ultraviolet/ultraviolet, and a broad peak in the range of blue color (in the peak wavelength range from 400 nm to 500 nm) when the phosphor is irradiated with the light in the wavelength range of the near ultraviolet/ultraviolet.

According to the phosphor of either of the ninth or tenth aspect, the phosphor thus obtained is in a powdery state, therefore is easy to be pulverized, and can be applied on various places as a paste. In addition, the average particle size (D50) of the phosphor is not less than 1.0 μm and not more than 20.0 μm, and therefore coating density can be increased, whereby a coating film having high emission intensity and luminance can be obtained.

According to the manufacturing method of the phosphor of any one of the eleventh to thirteenth aspects, the phosphor according to any one of the first to tenth aspects can be manufactured at a low manufacturing cost.

According to the manufacturing method of the phosphor of the fourteenth aspect, the carbonate serving as the raw material acts as flux, thereby accelerating a solid phase reaction, and the phosphor having excellent emission characteristics and powder characteristics can be manufactured.

According to the light emitting device of any one of the fifteenth to seventeenth aspects, a high efficient light emitting device can be obtained, having a desired emission color and high emission intensity and luminance.

DETAILED DESCRIPTION OF THE PREFERRED EMBODIMENTS OF THE INVENTION

Figure 1:
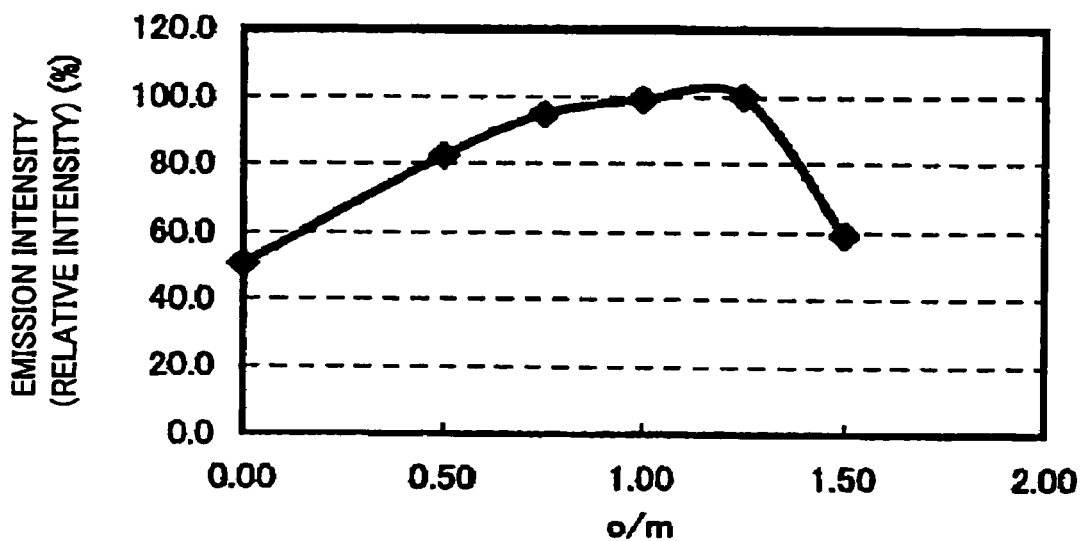
FIG. 1 is a graph showing a measurement result obtained by measuring an emission intensity of each phosphor of samples 1 to 6 of an example 1.

Embodiments of the present invention will be explained hereunder. However, the present invention is not limited thereto.

A phosphor according to this embodiment has a matrix composition given as a general formula expressed by MmAaBbOoNn:Z. Here, element M is one or more kind of element selected from the elements having bivalent valency in the phosphor. The element A is one or more kind of element having tervalent valency, element B is one or more kind of element having tetravalent valency, O is oxygen, N is nitrogen, and element Z is the element acting as the activator in the phosphor and is one or more kind of elements selected from rare earth elements or transition metal elements.

Further, in the phosphor, $(a+b)/m$ is in the range satisfying $5.0<(a+b)/m<9.0$, and $a/m$ is in the range satisfying $0 \leq a/m \leq 2.0$, the relation between oxygen and nitrogen is in the range satisfying $0 \leq o < n$, and nitrogen is expressed by $n=(2/3)m+a+(4/3)b-(2/3)o$.

The phosphor of this embodiment having the aforementioned characteristics has a high efficient excitation band in the range of the near ultraviolet/ultraviolet, and has an emission spectrum with a broad peak under an excitation of a part or the whole part of light having a wavelength range from 350 nm to 430 nm, with a maximum peak wavelength in the range from 400 nm to 500 nm, whereby a high efficient light emission can be obtained. Therefore, by mixing the phosphor and the phosphor of other suitable color, and by combining with the light emitting part such as the near ultraviolet/ultraviolet LED, the high efficient light emitting device having a desired emission color and high emission intensity and luminance can be obtained.

The phosphor of this embodiment has not only the excellent emission intensity and luminance compared to a phosphor $La_{1-x}Si_3N_5:xCe$ containing nitrogen as has been reported heretofore (for example, see patent document 1), but also exhibits excellent emission characteristics, when compared to BAM:Eu, $Sr_5(PO_4)_3Cl$:Eu, ZnS:Ag, (Sr, Ca, Ba, Mg)$_{10}$(PO$_4$)$_6$Cl$_2$:Eu, which are used as a white LED illuminating blue phosphor at present, to thereby make it possible to manufacture the white LED illumination having further high luminance.

An oxide phosphor BAM:Eu and a halophosphate phosphor SCAP:Eu used at present have excitation bands which rapidly fall, on the longer wavelength side of the wavelength of 380 nm or more, which is the near ultraviolet/ultraviolet region. Meanwhile, The phosphor of this example contains nitrogen and therefore has a large ratio of covalent bonding compared to the oxide phosphor, and has an excellent excitation band up to the longer wavelength side, compared to the oxide phosphor and the halophosphate phosphor used at present. Therefore, when the white LED illumination is manufactured by combining with the near ultraviolet/ultraviolet LED, the variance in the color tone of the white light can be suppressed.

The phosphor of this embodiment has the high efficient excitation band in the range of the near ultraviolet/ultraviolet, and has the emission spectrum with a broad peak, with the maximum peak wavelength in the range from 400 nm to 500 nm, under the excitation of the light in the wavelength range from 350 nm to 430 nm, whereby the high efficient light emission can be obtained. Although a detailed reason is unclear, it can be substantially considered as follows.

First, in the phosphor of this embodiment expressed by the general composition formula MmAaBbOoNn:Z, by setting the values of m, a, b, o, and n in the range of $5.0<(a+b)/m<9.0$, $0 \leq a/m \leq 2.0$, $0 \leq o<n$, $n=(2/3)m+a+(4/3)b-(2/3)o$, the activator serving as the center of light emission can regularly exists in a distance not allowing concentration quenching to occur in a crystal structure of the phosphor, and an excitation energy used for light emission is efficiently transferred. This contributes to improving the emission efficiency.

Further, when the phosphor is thus constituted, chemically stable composition is thereby realized. Therefore, an impurity phase not contributing to light emission is hardly generated, and it appears that deterioration in emission intensity is suppressed. In other words, when a plurality of impurity phases are generated, the phosphor per unit area is decreased, and further the emission efficiency is deteriorated and the high emission intensity is not obtained, when the impurity phases thus generated absorb the excitation light and the light generated from the phosphor.

Specifically, when $(a+b)/m$ is in the range of $5.0<(a+b)/m<9.0$, and $a/m$ is in the range of $0 \leq a/m \leq 2.0$, preferably a phase emitting yellow color and orange color as an impurity phase is prevented from generating, and the emission intensity of blue color is prevented from deteriorating. In addition, when the relation between oxygen and nitrogen is in the range of $0 \leq o<n$, vitrifying that occurs when the molar ratio of the oxygen becomes larger than the molar ratio of the nitrogen can be prevented. Therefore, preferably, crystallinity is not deteriorated, and the emission intensity is prevented from deteriorating. Also, from the viewpoint of the crystal structure, it is preferable that the phosphor contains a slight amount of oxygen.

In addition, in the phosphor having the aforementioned general composition formula MmAaBbOoNn:Z, the element M is the element having bivalent valency, the element A is the element having tervalent valency, element B is the element having tetravalent valency, and nitrogen is the element having—tervalent valency. Therefore, when m, a, b, o, and n have the relation expressed by $n=(2/3)m+a+(4/3)b-(2/3)o$, the valency of each element is added to become zero, and preferably the phosphor becomes a chemically stable compound.

In the phosphor of this embodiment expressed by the general formula MmAaBbOoNn:Z, the values of m, a, b, o, and n may be in the range of $5.0<(a+b)/m<9.0$, $0 \leq a/m \leq 2.0$, $0 \leq o<n$, $n=(2/3)m+a+(4/3)b-(2/3)o$, and further preferably $0.0<a/m \leq 2.0$, $4.0 \leq b/m \leq 8.0$, and $0<o/m \leq 3.0$. This is because by setting optimal values of a and o in the aforementioned range in accordance with the values of m and b, generation of impurity phases can be significantly prevented, and deterioration in crystallinity due to vitrification can be prevented. This is because when a/m is not more than 2.0, an orderly stable network can be established in terms of structure, by the element A, the element B, the oxygen, and the nitrogen, and AlN, which is a raw material, is not remained as an unreacted raw material, but can be substantially fully solved in a tetrahedral (SiN$_4$) network.

Meanwhile, preferably the element M is one or more kind of element selected from a group consisting of Mg, Ca, Sr, Ba, and Zn, and rare earth elements having bivalent valency, more preferably is one or more kind of element selected from the group consisting of Mg, Ca, Sr, Ba, and Zn, and most preferably is Sr. In any case, preferably the element M contains Sr.

Preferably the element A is one or more kind of element selected from a group consisting of Al, Ga, In, Tl, Y, Sc, P, As, Sb, and Bi, more preferably is one or more kind of element selected from the group consisting of Al, Ga, and In, and most preferably is Al. In regards to Al, AlN, which is nitride, is used as a general thermoelectric material and structural material, and is easily available at a low cost with a small environmental load.

Preferably, the element B is one or more kind of element selected from the group consisting of Si, Ge, Sn, Ti, Hf, Mo, W, Cr, Pb, and Zr, more preferably is Si and/or Ge, and most preferably is Si. In regards to Si, Si$_3$N$_4$, which is nitride, is used as a general thermoelectric material and structural material, and is easily available at a low cost with a small environmental load.

The element Z is one or more kind of element selected from the group consisting of the rare earth elements and transition metal elements, which is blended in the form of replacing a part of the element M in a matrix structure of the phosphor. From the viewpoint of exhibiting a sufficient color rendering properties by various light sources such as a white LED illumination using the phosphor of this embodiment, it is preferable for the phosphor to have the emission spectrum with a peak having a broad half value width. From this viewpoint, preferably the element Z is one or more kind of element selected from the group consisting of Eu, Ce, Pr, Tb, Yb, and Mn. Among these elements, when Eu is used as the element Z, the phosphor exhibits a blue and broad emission spectrum with high emission intensity. Therefore, Eu is preferable as the activator to the phosphor used for each kind of light source such as the white LED illumination.

Preferably, an amount of the element Z to be added is in the range of not less than 0.0001 and not more than 0.50 in the molar ratio $z/(m+z)$ of the element M to the element Z, which is the activator, when the phosphor according to the present invention is expressed by a general formula MmAaBbOoNn:Zz (satisfying $5.0<(a+b)/m<9.0$, $0 \leq a/m \leq 2.0$, $0 \leq o<n$, $n=(2/3)m+a+(4/3)b-(2/3)o$. When the molar ratio $z/(m+z)$ of the element M to the element Z is in the above-described range, deterioration in the emission efficiency can be averted, which is caused by concentration quenching due to excessive content of the activator (element Z). Meanwhile, the deterioration in the emission efficiency can also be averted, which is caused by insufficient emission contributing element due to inadequate content of the activator (element Z). Further, more preferably, the value of the $z/(m+z)$ is in the range of not less than 0.001 and not more than 0.30. However, an optimal value of the range of the value of the z/(m+z) is slightly fluctuated according to the kind of the activator (element Z) and the kind of the element M. Further, by controlling the amount of the activator (element Z) to be added also, the peak wavelength of the emission of the phosphor can be set to be shifted, and this is effective when adjusting the luminance and chromaticity in the light source obtained.

Also, by selecting the element Z, the peak wavelength of the light emission in the phosphor of this embodiment can be changed, and by activating with a different kind of element Z, the peak wavelength can be changed and further the emission intensity and luminance can be improved by a photosensitizing effect.

In addition, when Sr is selected as the element M, Al is selected as the element A, Si is selected as the element B, and Eu is selected as the element Z in the range satisfying $5.0 < (a+b)/m < 9.0$, $0.0 < a/m \leq 2.0$, $4.0 \leq b/m \leq 8.0$, $0 < o/m \leq 3.0$, $n = (2/3)m + a + (4/3)b - (2/3)o$, a weight ratio of the element constituting the phosphor was obtained. Then, it was found that when 16.0 wt % to 25.0 wt % of Sr, 2.0 wt % to 9.0 wt % of Al, 34.5 wt % to 44.5 wt % of Si, 0.5 wt % to 11.5 wt % of O, 23.0 wt % to 32.0 wt % of N, not more than 3.5 wt % of Eu exceeding 0 were contained (however, ±1.0 wt % of error is estimated in Sr and Al, and ±2.0 wt % of error is estimated in Si), and when the phosphor has the emission spectrum with a maximum peak wavelength from 400 nm to 500 nm under the excitation of the light with the wavelength range from 350 nm to 430 nm, a sufficient emission intensity was exhibited, and a preferable emission characteristic was exhibited as the blue phosphor particularly for white LED illumination.

When the values of m, a, b, o, and n of each element calculated from a composition analysis result, and the values of m, a, b, o, and n calculated by the blending ratio of the raw materials to be used are compared, a slight deviation is generated. This is because a little amount of raw material is decomposed or evaporated during firing, and further is considered to be caused by an analysis error. Particularly, when o is calculated, the oxygen slightly contained is not taken into consideration, such as the oxygen initially contained in the raw material, the oxygen adhered to the surface, the oxygen mixed in by oxidization of the surface of the material when the raw material is weighed, mixed, and fired, and further the oxygen adsorbed on the surface of the phosphor after firing. When the raw materials are fired in an atmosphere containing the nitrogen gas and/or ammonia gas, the raw material is nitrided during firing and a slight deviation is generated in o and n.

In the phosphor obtained by this embodiment, in an X-ray diffraction pattern by the powder method using CoKα ray, a diffraction peak with highest intensity is shown in a Bragg angle (2θ) range from 35° to 37°, and further in the Bragg angle (2θ) range from 23.6° to 25.6°, 33° to 35°, 39.7° to 40.7°, and 43° to 44°. In this range, two, two, one and one characteristic diffraction peaks are shown, respectively and when a relative intensity of the diffraction peak with highest intensity observed in the Bragg angle (2θ) range from 35° to 37° is defined as 100%, the relative intensity of the diffraction peaks is not less than 2.0% and not more than 40%. The diffraction pattern of the phosphor thus obtained has a resemblance to the diffraction pattern of $Sr_2Al_2Si_{10}O_4N_{14}$ which is reported in JCPDS card (53-0636), and is considered to have a structure close to the structure of the $Sr_2Al_2Si_{10}O_4N_{14}$, although the Bragg angle (2θ) of diffracted ray is different. Accordingly, in the phosphor thus obtained by this embodiment, it appears that a crystal unit lattice is changed due to a small amount of oxygen, or a system having a different crystal structure is generated, compared to the aforementioned $Sr_2Al_2Si_{10}O_4N_{14}$.

In addition, in the X-ray diffraction pattern by the powder method, preferably there is no diffraction peak with 10% or more relative intensity in the Bragg angle (2θ) range from 26° to 33°, 38.7° to 39.7°, and 42.0° to 42.8°, when the relative intensity of the diffraction peak with highest intensity which is observed in the Bragg angle (2θ) range from 35° to 37° is defined as 100%. This is because the diffraction peak observed in the aforementioned range is caused by an impurity phase different from the phase having the emission spectrum with a peak in the wavelength range from 400 nm to 500 nm, and when a plurality of impurity phases are generated, the impurity phases thus generated absorb the excitation light and the light generated from the phosphor, thereby deteriorating the emission efficiency and allowing no high efficient emission intensity to be obtained.

Further, in the X-ray diffraction pattern by the powder method using CoKα ray, the diffraction peak with highest intensity in the Bragg angle (2θ) range from 35° to 37° is focused. Then, it is found that by containing Al in constituent elements, there are two peaks (see X-ray diffraction pattern of each phosphor sample such as sample 1 and sample 5 of example 1, sample 10, sample 12, and sample 14 of example 2, and sample 21 of example 3, and sample 28 of example 4 in FIG. 3 and FIG. 10 as will be described later). Then, it was found that the phosphor having the X-ray diffraction pattern with two peaks (in the aforementioned range) by adding Al, is liable to have a more excellent emission characteristic.

By forming the phosphor of this embodiment in a powdery state, it can be easily applied to various light sources such as the white LED illumination. Here, the phosphor thus formed contains primary particles having particle size of 20 μm or less and an aggregate in which the primary particles are aggregated each other, wherein preferably an average particle size (D50) of a phosphor powder containing the primary particles and the aggregate is not less than 1.0 μm and not more than 20.0 μm. The reason is that since the emission mainly occurs on a grain surface in the phosphor powder, if the average particle size is not more than 20 μm, the specific surface area per unit weight of the powder can be secured, thereby averting the deterioration in luminance. Further, when the powder is formed in a pasty state and applied on an emitting element or the like, density of the powder can be increased, and from this viewpoint, the deterioration in luminance can be averted. In addition, according to the study of the inventors et al. of the present invention, although detailed reason is not clarified, it was found that the average particle size was preferably larger than 1.0 μm from the viewpoint of the emission efficiency of the phosphor powder. As described above, preferably the average particle size of the phosphor powder of the present invention is set to be not less than 1.0 μm and not more than 20 μm.

The phosphor of this embodiment has the emission spectrum with a peak in the range from 400 nm to 500 nm with a broad peak shape, has an excellent emission intensity and luminance, and therefore is suitable for the white LED illuminating phosphor. Further, the phosphor of this embodiment has the emission spectrum with an excellent excitation band in the range from the near ultraviolet/ultraviolet, and therefore, it can be used in a condition which is closer to a maximum emission intensity, when used in the white LED illumination system in which white color is obtained by using a mixed state of the light obtained from the R, G, B and other phosphor, by combining the LED emitting the near ultraviolet/ultraviolet light (near the wavelength range from 380 to 410 nm) proposed as the one-chip type white LED illumination and the red (R) color emitting phosphor, the green (G) color emitting phosphor, and the blue (B) color emitting phosphor excited by the near ultraviolet/ultraviolet light generated from the LED. Specifically, by combining the light emitting part for emitting the near ultraviolet/ultraviolet light and the phosphor, a white color light source and the white LED illumination with high output and excellent color rendering properties, and further an illumination unit using the same can be obtained.

By combining the blue phosphor of this embodiment formed in a powdery state and the publicly-known green phosphor and the red phosphor, to prepare a phosphor mixture containing the phosphor of this embodiment, and by combining with the light emitting part for emitting light with the wavelength range from 250 nm to 450 nm, preferably the wavelength range from 350 nm to 430 nm, various kinds of illumination devices and mainly a back light for a display apparatus can be manufactured.

As the green phosphor to be combined with, $Sr_2Al_2Si_{10}ON_{14}$:Eu, (Sr, Ca)$Si_2O_2N_2$:Eu, ZnS:Cu,Al, ZnS:Cu, $SrAl_2O_4$:Eu, BAM:Eu, Mn, (Ba, Sr, Ca)$_2SiO_4$:Eu are given as examples, however this is not limited thereto. Also, as the red phosphor to be combined with, $Y_2O_2S$:Eu, $La_2O_2S$:Eu, $3.5MgO.0.5MgF_2.GeO_2$:Mn, (La, Mn, Sm)$_2O_2S.Ga_2O_3$:Eu, SrS:Eu, CaS:Eu, $Sr_2Si_5N_8$:Eu, (Ca, Sr)$_2Si_5N_8$:Eu, $CaAlSiN_3$:Eu are given as examples, however this is not limited thereto.

As the light emitting part, for example, the LED light emitting element for emitting light in the wavelength range from ultraviolet to near ultraviolet and a discharge lamp generating ultraviolet light can be used. When the phosphor mixture containing the phosphor of this embodiment is combined with the LED light emitting element, various kinds of illumination units and the back light for display apparatus can be manufactured. When the phosphor mixture of this embodiment is combined with the discharge lamp, various kinds of fluorescent lamps, the illumination unit, and the back light for the display apparatus can be manufactured.

A method of combining the phosphor mixture of this embodiment and the light emitting part may be performed by the publicly-known method. However, when the LED is used in the light emitting part of the light emitting device, the light emitting device can be manufactured as will be described below. The light emitting device using the LED in the light emitting part will be explained hereunder, with reference to the drawings.

Figure 14:
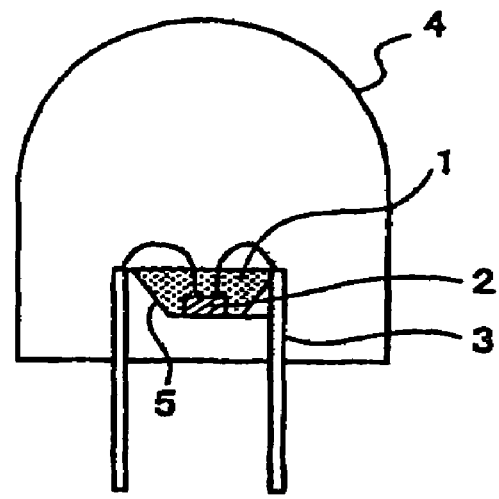
FIG. 14 is a schematic sectional view showing a general type LED light emitting device.
Figure 14:
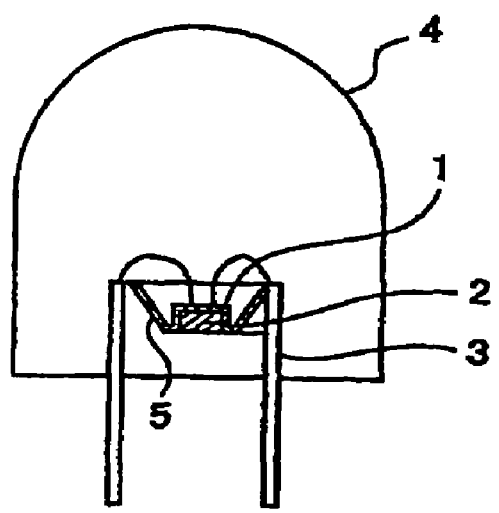
Figure 14:
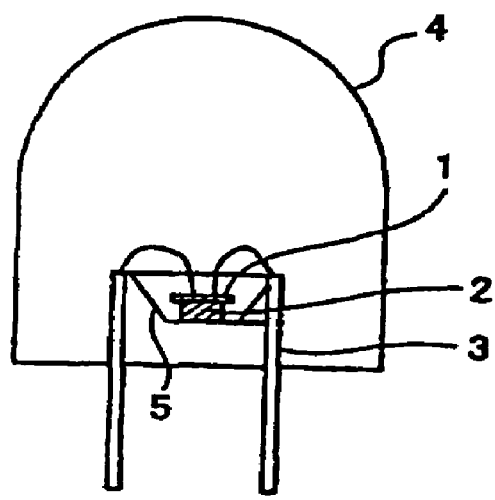

FIG. 14A to FIG. 14C are schematic sectional views of general type LED light emitting devices, and FIG. 15A to FIG. 15E are schematic sectional views of reflective type LED light emitting devices. Note that the same signs and numerals are assigned to the corresponding part in each drawing, and explanation is omitted in some cases.

First, by using FIG. 14A, explanation will be given to an example of the light emitting device in which the LED is used in the light emitting part, and the LED and the phosphor mixture are combined. In the general type LED light emitting device, an LED light emitting element 2 is set in a cup case 5 provided on the point of a lead frame 3, and is molded by a transparent resin 4. In this embodiment, the cup case 5 is totally buried with the phosphor mixture and a mixture obtained by dispersing the phosphor mixture in a translucent resin such as silicon and epoxy.

Next, by using FIG. 14B, explanation will be given to an example of a different light emitting device. In this embodiment, a mixture 1 is applied on the cup case 5 and the upper surface of the LED light emitting element 2.

Next, by using FIG. 14C, explanation will be given to an example of a further different light emitting device. In this embodiment, the phosphor mixture 1 is set on the upper part of the LED light emitting element 2.

As described above, in the general type LED light emitting device explained by using FIG. 14A to FIG. 14C, although a light releasing direction from the LED light emitting element 2 is directed upward, even when the light releasing direction is directed downward, the light emitting device can be prepared by the same method. For example, the reflective type LED light emitting device is provided, in which a reflecting surface and a reflecting board are formed in a light releasing direction of the LED light emitting element 2, and the light released from the light emitting element 2 is reflected by the reflecting surface and emitted outside. Therefore, by using FIG. 15A to FIG. 15E, explanation will be given to the light emitting device in which the reflective type LED light emitting device and the phosphor mixture of this embodiment are combined.

Figure 15:
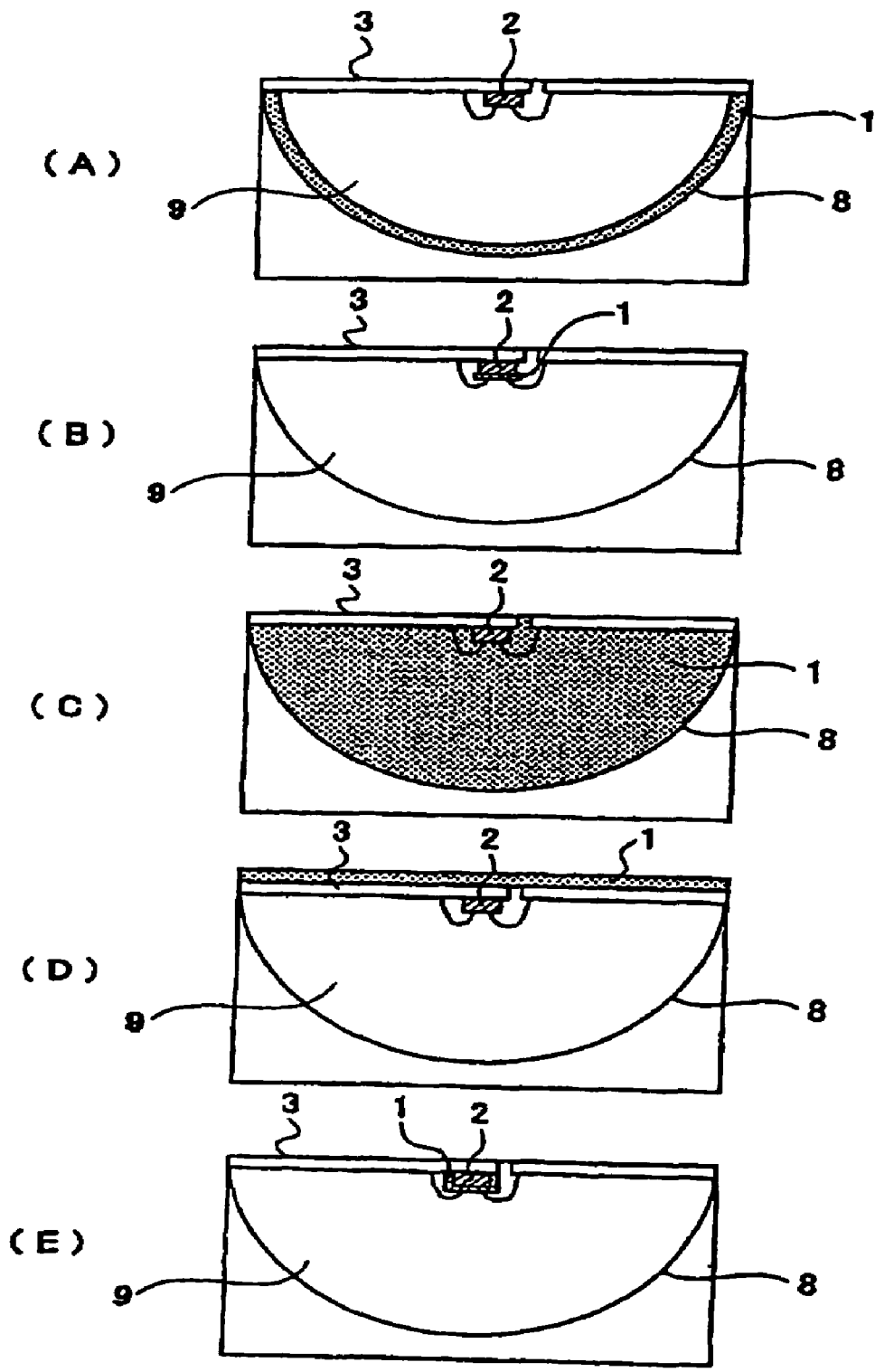
FIG. 15 is a schematic sectional view showing a reflective type LED light emitting device.

First, by using FIG. 15A, explanation will be given to an example of the light emitting device in which the reflective type LED light emitting device is used in the light emitting part, and the reflective type LED light emitting device and the phosphor mixture of this embodiment are combined. In the reflective type LED light emitting device, the LED light emitting element 2 is set on the point of one lead frame 3, and the light is emitted from the LED light emitting element 2, directing downward, then reflected by a reflecting surface 8, and released from the upper part. In this embodiment, the mixture 1 is applied on the reflecting surface 8. Note that a recessed portion formed by the reflecting surface 8 is sometimes filled with a transparent mold material 9 for protecting the LED light emitting element 2.

Next, by using FIG. 15B, explanation will be given to an example of a different light emitting device. In this embodiment, the mixture 1 is set at a lower part of the LED light emitting element 2.

Next, by using FIG. 15C, explanation will be given to an example of the different light emitting device. In this embodiment, the recessed portion formed by the reflecting surface 8 is filled with the mixture 1.

Next, by using FIG. 15D, explanation will be given to an example of the different light emitting device. In this embodiment, the mixture 1 is applied on the upper part of the transparent mold material 9 for protecting the LED light emitting element 2.

Next, by using FIG. 15E, explanation will be given to an example of the different light emitting device. In this embodiment, the mixture 1 is applied on the surface of the LED light emitting element 2.

The general type LED light emitting device and the reflective type LED light emitting device may be used selectively depending on the application. However, the reflective type LED light emitting device has an advantage that it can be made thin, a light emitting area can be made large, and use efficiency of the light can be improved.

When the light emitting device thus explained is used as an illuminating light source with high color rendering properties, it is necessary to have the emission spectrum with excellent color rendering properties. Therefore, by using an evaluation method of JIS Z 8726, the color rendering properties of the light emitting device incorporating the phosphor mixture containing the phosphor of this embodiment was evaluated. In the evaluation of the JIS Z 8726, when a general color rendering index value Ra of the light source is set at 80 or more, the light source is regarded as an excellent light emitting device. Preferably, when a special color rendering index value R15, which is an index showing a skin color component of a Japanese woman, is set at 80 or more, the light source is regarded as the excellent light emitting device. However, the aforementioned index may not be satisfied, depending on the application not obtaining the color rendering properties and a different purpose.

Therefore, the light emitting device was manufactured, by which the phosphor mixture containing the phosphor of this embodiment was irradiated with the light from the light emitting part which emits light with the wavelength range from 350 nm to 430 nm, to cause the phosphor mixture to emit light. Note that an ultraviolet LED for emitting light of 405 nm wavelength was used as the light emitting part.

Further, the color rendering properties of the light emitted by the light emitting device was evaluated. As a result, the color rendering properties of the light source incorporating the phosphor mixture containing the phosphor of this embodiment exhibited improved values such as Ra set at 80 or more, R15 set at 80 or more in the range of correlated color temperature from 10000K to 2500K, and it was found that the light emitting device thus explained was regarded as an excellent light source with high luminance and significantly improved color rendering properties.

Next, as a manufacturing method of the phosphor of this embodiment, explanation will be given to an example of a manufacture of $SrAlSi_{6.5}O_{1.25}N_{9.50}$:Eu (wherein Eu/(Sr+Eu)=0.030). The $SrAlSi_{6.5}O_{1.25}N_{9.50}$:Eu becomes $Sr_{0.970}AlSi_{6.5}O_{1.295}N_{9.50}$:$Eu_{0.030}$, when expressed by using the general formula MmAaBbOoNn:Zz, and when $EU_2O_3$ is used as the raw material of the activator Eu and the oxygen of the $Eu_2O_3$ is taken into consideration. Here, z/(m+z) and Eu/(Sr+Eu) have the same meaning. Note that this composition formula is obtained by calculating from the blending ratio of the raw materials used.

Generally, a plurality of phosphors are manufactured by the solid phase reaction, and the manufacturing method of the phosphor of this embodiment can also be obtained by the solid phase reaction. However, the manufacturing method is not limited thereto. Each raw material of the element M, the element A, and the element B may be a commercially available materials such as nitride, oxide, carbonate, hydroxide, basic carbonate. However, higher purity is preferable and the raw material with 2N or more, more preferably with 3N or more is therefore prepared. Preferably, the particle size of each particle of the raw materials is generally a fine particle from the viewpoint of accelerating reaction. However, the particle size and the shape of the phosphor obtained are changed according to the particle size and the shape of the raw material. Therefore, by adjusting to the particle size required for the phosphor finally obtained, the nitride raw material having the particle size approximating to that of the phosphor thus finally obtained may be prepared. As the raw material of the element Z also, the commercially available raw material such as nitride, oxide, carbonate, hydroxide, basic carbonate, or simple substance metal is preferable. Of course, higher purity is preferable, and therefore the raw material preferably with the purity of 2N or more, more preferably with the purity of 3N or more is prepared. Particularly, when the carbonate is used as the raw material of the element M, an effect of flux can be preferably obtained, without adding the compound composed of the element not contained in the constituent element of the phosphor of this embodiment as the flux (reaction promotor).

When manufacturing $SrAlSi_{6.5}O_{1.25}N_{9.50}$:Eu (wherein Eu/(Sr+Eu)=0.030), $SrCO_3$(3N), $Al_2O_3$(3N), AlN(3N), $Si_3N_4$ (3N) may be prepared as the raw materials of the element M, the element A, and the element B, and $Eu_2O_3$(3N) may be prepared as the element Z. The raw materials thus prepared are weighed and mixed so as to obtain the mixing ratio of each raw material set at 0.970 mol of $SrCO_3$, 0.25/3 mol of $Al_2O_3$, (1.0−0.25/3×2) mol of AlN, 6.5/3 mol of $Si_3N_4$, and 0.030/2 mol of $Eu_2O_3$ respectively, so that the molar ratio of each element becomes Sr:Al:Si:O:Eu=0.970:1:6.5:1.295:0.030. The carbonate is used as the Sr raw material. This is because an oxide raw material has a high melting point, and therefore the effect of the flux can not be expected, meanwhile, when the raw material having a low melting point such as carbonate, the raw material itself acts as the flux, thereby promoting the reaction and improving the emission characteristic.

In addition, when the oxide is used as the raw material, another substance may be added as the flux, to obtain the effect of the flux. However, in this case, it should be noted that the flux becomes the impurity, thereby posing the possibility of deteriorating the characteristic of the phosphor. The weighing and mixing may be performed in an atmospheric air, however the nitride of each raw material element is easily influenced by humidity, and therefore the inert gas from which the humidity is sufficiently removed is preferably used, to operate in a glove box. A mixing system may be either way of a wet type or a dry type. However, when pure water is used as the solvent of the wet type mixing, the raw material is decomposed, and therefore proper organic solvent needs to be selected. As a device, usual device such as a ball mill and a mortar may be used.

The raw materials thus mixed are put in a crucible, retained in an atmosphere containing one or more kind of gas selected from an inert gas such as nitrogen and rare gas and ammonia gas at 1600° C. or more, more preferably at 1700° C. to 2000° C., for 30 minutes or more, and fired. When the firing temperature is set at 1600° C. or more, the solid reaction progresses preferably and the phosphor having the excellent emission characteristic can be obtained. In addition, when the raw materials are fired at 2000° C. or less, excessive sintering and melting can be prevented from occurring. The higher the firing temperature is, the more rapidly the firing is advanced, and the retaining time can therefore be shortened. Meanwhile, even when the firing temperature is low, the target emission characteristics can be obtained by maintaining the temperature for a long time. However, the longer the firing time is, the more particle growth is advanced, and the particle size becomes therefore large. Therefore, the firing time may be set in accordance with the target particle size. Meanwhile, conventionally, in regards to $BaSi_7N_{10}$:Eu, the structure and the emission characteristic have been examined as described from page 21 of ISBN 90-386-2711-4, TU Eindhoven 2000 in "On new rare-earth doped M-Si—Al—O—N materials", written by van Krevel. However, in regards to $SrSi_7N_{10}$:Eu, in which Ba is replaced with Sr, a difference in product phase due to the difference in firing temperature, and the structure and the emission characteristic have not been studied in detail. However, after studying on the $SrSi_7N_{10}$:Eu by the inventors of the present invention, in regards to the $SrSi_7N_{10}$:Eu also, the blue phosphor having the emission spectrum with a peak in the wavelength range from 400 nm to 500 nm can be obtained, by firing the raw materials at 1600° C. or more.

The pressure in the furnace is preferably set at 0.5 MPa or less during firing, and more preferably set at 0.1 MPa. This is because by firing the raw materials under the pressure of 0.5 MPa or less, excessive sintering can be prevented between particles., and pulverizing after firing can be facilitated. The crucible may be used, such as an $Al_2O_3$ crucible, a $Si_3N_4$ crucible, an AlN crucible, a sialon crucible, a C (carbon) crucible, and a BN (boron nitride) crucible, which can be used in the inert atmosphere. However, when the BN crucible is used, preferably intrusion of impurities from the crucible can be averted.

In addition, preferably firing is performed with the aforementioned gas atmosphere being kept flowing in the furnace at a flow rate of 0.1 ml/min or more. This is because although gas is generated from the raw material during firing, by flowing the atmosphere containing one or more kind of gas selected from the aforementioned inert gas such as nitrogen and rare gas, and ammonia gas, the furnace can be prevented from being filled with the gas generated from the raw material, resulting in having an influence on the reaction, and consequently the deterioration in the emission characteristic of the phosphor can be prevented. Particularly, when the raw material which is decomposed into oxides at high temperature, such as carbonate, hydroxide, and basic carbonate is used, a large amount of gas is generated. Therefore, preferably by flowing the gas in a firing furnace, generated gas is exhausted.

After completing the firing, a fired matter is taken out from the crucible. Then, by using a pulverizing means such as the mortar and the ball mill or the like, the fired matter is pulverized to obtain a prescribed average particle size, and the phosphor expressed by the composition formula $SrAlSi_{6.5}O_{1.25}N_{9.50}$:Eu (wherein Eu/(Sr+Eu)=0.030) can be manufactured. The phosphor thus obtained is subjected to cleaning, classifying, and surface treatment as needed.

When other element is used as the element M, the element A, the element B, and the element Z, and when an amount of Eu to be activated, which is an activator, is changed, the phosphor can be manufactured by the same manufacturing method as that described above, by adjusting the blending amount of each raw material during mixing to a predetermined composition ratio.

EXAMPLES

The present invention will be more specifically explained, based on examples.

Example 1

In an example 1, sample 1 to sample 6 were manufactured by procedures as will be described below. In the samples 1 to 6, $SrSi_7N_{10}$:Eu and $SrSi_7N_{10}$:Eu with some replacement of oxygen in nitrogen-site were prepared by firing at 1800° C.

First, the manufacturing method of $SrSi_7N_{10}$:Eu of the sample 1 will be explained. The commercially available $Sr_3N_2$(2N), $Si_3N_4$(3N), and $Eu_2O_3$(3N) were prepared as the raw materials, and each raw material was weighed to obtain 0.970/3 mol of $Sr_3N_2$, 7/3 mol of $Si_3N_4$, and 0.030/2 mol of $Eu_2O_3$, so that the molar ratio of each element becomes Sr:Si:Eu=0.970:7:0.030, and mixed by using the mortar in the atmospheric air. The raw materials thus mixed were put in the BN crucible, and after vacuously exhausting the inside of the furnace once, temperature was increased at 15° C./min up to 1800° C. with the pressure in the furnace set at 0.05 MPa in the nitrogen atmosphere (flow state at 20.0 L/min), and the raw materials were retained/fired at 1800° C. for 3 hours, then, the temperature was cooled from 1800° C. to 50° C. for 90 minutes. Thereafter, a fired sample was pulverized by using the mortar up to a proper particle size in the atmospheric air, to thereby obtain the phosphor of the sample 1 expressed by the composition formula $SrSi_7N_{10}$:Eu (wherein Eu/(Sr+Eu)=0.030). Note that the composition formula thus obtained is calculated from the blending ratio of the raw materials used.

Next, the manufacturing method of the samples 2 to 6 will be explained. In the samples 2 to 6, characteristic change was examined when the molar ratio of Sr and Si was fixed to 1 and 7 respectively, and o/m ratio (oxygen concentration) was changed in the phosphor sample expressed by the composition formula $SrSi_7O_oN_n$:Eu (Eu/(Sr+Eu)=0.030, n=(2/3)m+a+(4/3)b−(2/3)o, m=1, a=0, b=7). In the manufacture of each samples 2 to 6, as the raw material, in addition to the commercially available $Sr_3N_2$(2N), $Si_3N_4$(3N), and $Eu_2O_3$(3N), $SrCO_3$(3N) and $SiO_2$(3N) were prepared as the raw material supplying oxygen. Then, by mixing each raw material at a predetermined molar ratio, the samples 2 to 6 were manufactured in the same way as the sample 1, excepting that a part of N (nitrogen) of the $SrSi_7N_{10}$:Eu is replaced with O (oxygen).

The o/m ratio is adjusted to be o/m=0.50 (sample 2), o/m=0.75 (sample 3) by using $Sr_3N_2$, $SrCO_3$, $Si_3N_4$, and $Eu_2O_3$ as the raw materials, to be o/m=1.00 (sample 4) by using $SrCO_3$, $Si_3N_4$, and $Eu_2O_3$, and to be o/m=1.25 (sample 5) and o/m=1.50 (sample 6) by using $SrCO_3$, $SiO_2$, $Si_3N_4$, and $Eu_2O_3$.

For example, in the sample 2, each raw material may be weighed to obtain 0.50 mol of $SrCO_3$, (0.970−0.50)/3 mol of $Sr_3N_2$, 7/3 mol of $Si_3N_4$, and 0.030/2 mol of $Eu_2O_3$ so that the molar ratio of each element becomes Sr:Si:O:Eu=0.970:7:0.50:0.030. In the sample 5, each raw material may be weighed to obtain 0.970 mol of $SrCO_3$, (1.25−0.970)/2 mol of $SiO_2$, (7−(1.25−0.970)/2)/3 mol of $Si_3N_4$, and 0.030/2 mol of $Eu_2O_3$ so that the molar ratio of each element becomes Sr:Si:O:Eu=0.970:7:1.25:0.030.

The peak wavelength and the emission intensity of the samples 1 to 6 thus manufactured were measured. The measurement result is shown in table 1 and FIG. 1. Here, in FIG. 1 is a graph showing the relative intensity of the emission intensity of the phosphor sample taken on the ordinate axis, and the value of the o/m ratio taken on the abscissa axis. Note that the value of the emission intensity in the peak wavelength of the o/m=1.25 (sample 5) was defined as 100%. The light with the wavelength of 405 nm was used as the excitation light.

As clearly shown in the result of the table 1 and FIG. 1, the emission intensity of each phosphor is increased, as the value of the o/m ratio becomes large, showing the highest emission intensity when the o/m ratio is expressed by o/m=1.25. Further, when the value of the o/m ratio is 1.25 or more, the emission intensity is significantly decreased.

This is because by replacing a part of N (nitrogen) of $SrSi_7N_{10}$:Eu with O (oxygen), energy from the excitation light which is absorbed in a matrix body can be efficiently transferred up to the center of the light emission, and the $SrCO_3$ used as the Sr raw material acts as the flux, to thereby accelerate the solid phase reaction. However, when the o/m ratio becomes larger than 1.25, the sample is vitrified, and the structure around Eu ion, which is the center of the light emission, is formed irregular, thereby generating variance in distance between the centers of the light emission, resulting in deterioration in the emission intensity.

Specifically, in the composition containing a slight amount of oxygen (samples 2 to 6), the crystal structure is optimized and the phosphor having the excellent emission characteristic can be obtained, rather than the composition of $SrSi_7N_{10}$:Eu.

TABLE 1

|  | COMPOSITION FORMULA | Eu/(Sr + Eu) | o/m | EXCITATION WAVELENGTH (nm) | PEAK WAVELENGTH (nm) | EMISSION INTENSITY (%) |
|---|---|---|---|---|---|---|
| SAMPLE 1 | $SrSi_{7.0}N_{10.00}$:Eu | 0.030 | 0.00 | 405 | 455.9 | 50.6 |
| SAMPLE 2 | $SrSi_{7.0}O_{0.50}N_{9.67}$:Eu | 0.030 | 0.50 | 405 | 455.5 | 82.5 |
| SAMPLE 3 | $SrSi_{7.0}O_{0.75}N_{9.50}$:Eu | 0.030 | 0.75 | 405 | 455.3 | 95.0 |
| SAMPLE 4 | $SrSi_{7.0}O_{1.00}N_{9.33}$:Eu | 0.030 | 1.00 | 405 | 455.5 | 99.2 |
| SAMPLE 5 | $SrSi_{7.0}O_{1.25}N_{9.17}$:Eu | 0.030 | 1.25 | 405 | 455.5 | 100.0 |
| SAMPLE 6 | $SrSi_{7.0}O_{1.50}N_{9.00}$:Eu | 0.030 | 1.50 | 405 | 455.5 | 59.3 |

Example 2

In the example 2, samples 7 to 14 were manufactured by the following procedure.

The samples 7 to 14 were manufactured in such a manner that the molar ratio of Sr, Al, and O was fixed to 1, 1, 1, respectively and the b/m ratio thereof was changed, and the raw materials were then fired at 1800° C., in the phosphor expressed by the composition formula SrAlSibONn:Eu (Eu/(Sr+Eu)=0.030, n=(2/3)m+a+(4/3)b−(2/3)o, m=1, a=1, and o=1) in which Al was further added to the constituent elements Sr, Si, O and N of the matrix body of the example 1, as the constituent element of the matrix body.

In addition, in the manufacture of each sample, the phosphor sample was manufactured in the same way as the sample 1 of the example 1, excepting that the commercially available $SrCO_3$(3N), AlN(3N), $Si_3N_4$(3N), and $Eu_2O_3$(3N) were prepared as the raw materials, and the mixing ratio of each raw material was adjusted to become a predetermined b/m ratio. Specifically, the b/m ratio is adjusted to be b/m=2 (sample 7), b/m=3 (sample 8), b/m=4 (sample 9), b/m=5 (sample 10), b/m=6 (sample 11), b/m=7 (sample 12), b/m=8 (sample 13), and b/m=9 (sample 14).

The peak wavelength and the emission intensity were measured for the samples 7 to 14 thus manufactured. The measurement result is shown in table 2 and FIG. 2. The emission intensity shown here is a maximum peak value of the spectrum of the light with the wavelength range from 400 nm to 500 nm released by the phosphor, when the phosphor is irradiated with the light of some wavelength or energy. (in other table and figure, the range of the wavelength showing the maximum peak is not limited.) Further, FIG. 3 shows the measurement result of the X-ray diffraction pattern of the phosphors of the samples 8, 10, 12, and 14 by the powder method, and a Rietveld analysis result of the sample 12, and a diffraction pattern of JCPDS card (53-0636).

Figure 2:
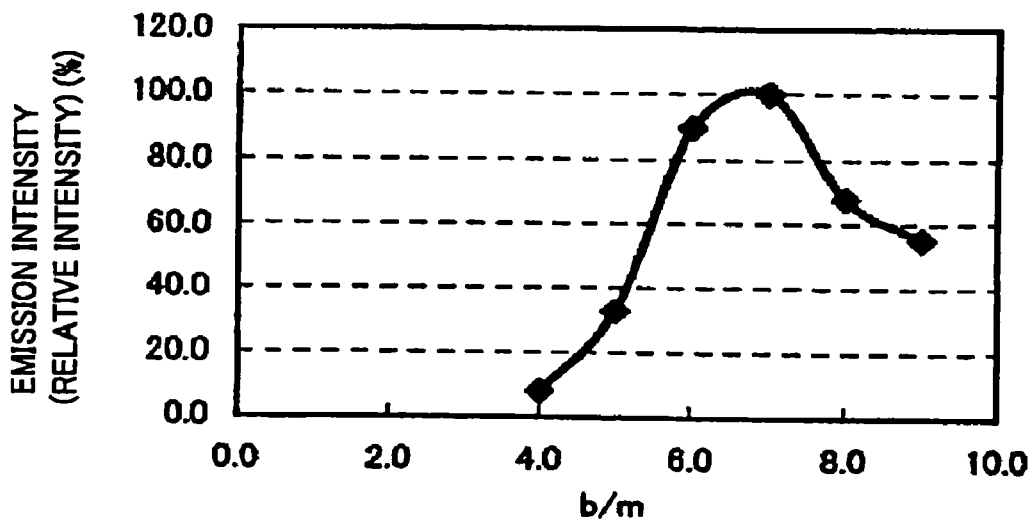
FIG. 2 is a graph showing the measurement result obtained by measuring the emission intensity of each phosphor of samples 7 to 14 of an example 2.
Figure 3:
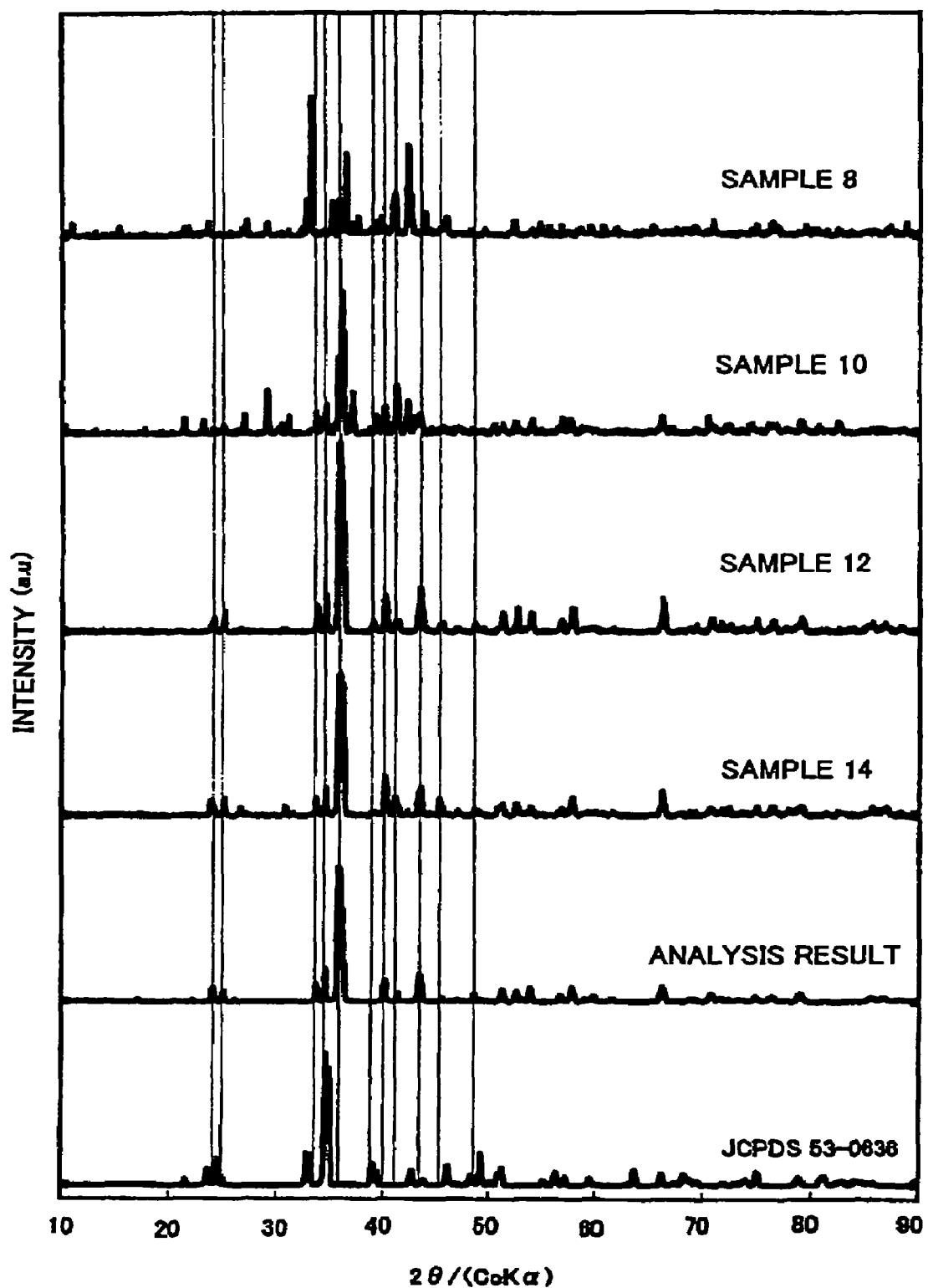
FIG. 3 is a graph showing the measurement result obtained by measuring an X-ray diffraction pattern of sample 8, sample 10, sample 12, and sample 14 by a powder method, and a simulation result obtained by the Rietveld analysis of a diffraction pattern simulated based on a crystal structure of $Sr_2Al_2Si_{10}O_4N_{14}$ of JCPDS card (53-0636) and the X-ray diffraction pattern of sample 12 based on the crystal structure of $Sr_2Al_2Si_{10}O_4N_{14}$.

Here, FIG. 2 is a graph showing the relative intensity of the emission intensity of the phosphor sample taken on the ordinate axis, and the value of the b/m ratio taken on the abscissa axis. In the emission intensity, the value of the emission intensity in the peak wavelength of b/m=7 (sample 12) was defined as 100%. The light with the wavelength of 405 nm was used as the excitation light.

As clearly shown in the table 2 and FIG. 2, the emission intensity of each of the phosphors is increased, as the value of the b/m ratio becomes large, showing the highest emission intensity near the range from b/m=6 to b/m=7. Then, the emission intensity is decreased when the value of the b/m ratio becomes 7 or more. When the value of the b/m ratio is 3 or less, the peak in the emission spectrum is not observed in the wavelength range from 400 nm to 500 nm, but the peak of the emission spectrum is observed at the wavelength of 630 nm or around.

TABLE 2

|  | COMPOSITION FORMULA | Eu/(Sr + Eu) | b/m | EXCITATION WAVELENGTH (nm) | PEAK WAVELENGTH (nm) | EMISSION INTENSITY (%) | COMMENT |
|---|---|---|---|---|---|---|---|
| SAMPLE 7 | $SrAlSi_{2.0}ON_{3.67}$:Eu | 0.030 | 2.0 | 405 | — | — | THERE IS NO PEAK IN THE RANGE FROM 400 nm to 500 nm |
| SAMPLE 8 | $SrAlSi_{3.0}ON_{5.00}$:Eu | 0.030 | 3.0 | 405 | — | — | THERE IS NO PEAK IN THE RANGE FROM 400 nm to 500 nm |
| SAMPLE 9 | $SrAlSi_{4.0}ON_{6.33}$:Eu | 0.030 | 4.0 | 405 | 445.8 | 7.9 | — |
| SAMPLE 10 | $SrAlSi_{5.0}ON_{7.67}$:Eu | 0.030 | 5.0 | 405 | 447.4 | 32.6 | — |
| SAMPLE 11 | $SrAlSi_{6.0}ON_{9.00}$:Eu | 0.030 | 6.0 | 405 | 451.1 | 89.6 | — |
| SAMPLE 12 | $SrAlSi_{7.0}ON_{10.3}$:Eu | 0.030 | 7.0 | 405 | 459.9 | 100.0 | — |
| SAMPLE 13 | $SrAlSi_{8.0}ON_{11.7}$:Eu | 0.030 | 8.0 | 405 | 459.9 | 68.1 | — |
| SAMPLE 14 | $SrAlSi_{9.0}ON_{13.0}$:Eu | 0.030 | 9.0 | 405 | 456.1 | 55.3 | — |

Here, a measurement method of the X-ray diffraction pattern of FIG. 3 by the powder method will be explained.

The phosphor to be measured was pulverized up to a predetermined (preferably from 1.0 μm to 20.0 μm) average particle size by using pulverizing means such as the mortar and the ball mill after firing. Then, a titanium holder is filled with the phosphor thus pulverized to form a flat surface, and the X-ray diffraction pattern was measured by an XRD apparatus by RIGAKU DENNKI INC., "RINT 2000". The measurement condition is shown below.

Measuring instrument: "RINT 2000" by RIGAKU DENKI INC.
X-ray bulb: CoKα
Tube voltage: 40 kV
Tube current: 30 mA
Scan method: 2θ/θ
Scan speed: 0.3°/min
Sampling interval: 0.01°
Start angle (2θ): 10°
Stop angle (2θ): 90°

It appears that the deviation of the Bragg angle (2θ) is caused by a not flat sample surface to be irradiated with X-ray, a measurement condition of the X-ray, and particularly by the difference in scan speed or the like. Therefore, a slight deviation is considered to be allowed in the range where a characteristic diffraction peak is observed. In order to suppress such a deviation as much as possible, the scan speed is set at 0.3°/min and then Si is mixed in the phosphor sample, and the deviation of the Si peak is corrected after X-ray measurement, to thereby obtain the Bragg angle (2θ). Hereunder, the same measurement was performed for the sample 1 of the example 1 of FIG. 9, the comparative example 1, the sample 1 and the sample 5 of the example 1 of FIG. 10, the sample 21 of the example 3, and the sample 28 of the example 4.

As clearly shown from the result of the X-ray diffraction pattern by the powder method of FIG. 3, the X-ray diffraction pattern of b/m=7 (sample 12) showing a strong emission intensity and the X-ray diffraction pattern of sample 11, sample 13, and samples 7 to 14 by the powder method are compared. Then, it is found that in regards to the diffraction pattern of the sample other than b/m=7 (sample 12), a plurality of diffraction peaks can be confirmed in the Bragg angle (2θ) in which no diffraction peak is observed by the b/m=7 (sample 12). Particularly, the diffraction peaks can be confirmed in the Bragg angle (2θ) range from 25° to 35°, 40° to 45°. It appears that such diffraction peaks are caused by a phase different from the phase having the emission spectrum with a peak in the wavelength range from 400 nm to 500 nm. In order to obtain the strong emission intensity, it is preferable to have no diffraction peak of such impurity phases.

Further, FIG. 3 shows the diffraction pattern simulated based on the crystal structure of $Sr_2Al_2Si_{10}O_4N_{14}$ reported in the JCPDS card (53-0636), and a simulation result obtained by subjecting the X-ray diffraction pattern of the sample 12 to Rietbeld analysis based on the crystal structure of the $Sr_2Al_2Si_{10}O_4N_{14}$ By a Rietbeld method, an actually measured diffraction intensity obtained by an actual measurement, and a diffraction intensity obtained theoretically by calculation from a crystal structure model assembled by estimating the crystal structure are compared, and various structure parameters in the latter model is precisely obtained by a minimum square method so as to make small a difference between both diffraction intensities, thereby leading to a more precise crystal structure.

The crystal structure of $Sr_2Al_2Si_{10}O_4N_{14}$ reported in the JCPDS card (53-0636) is orthorhombic, and a lattice constant is reported to be a=8.279, b=9.576, c=4.916. However, according to the analysis result of the sample 12, although the crystal structure is similarly orthorhombic, the lattice constant is a=7.902, b=9.278, c=4.838, showing the result that the crystal unit lattice is significantly smaller than that conventionally reported. It can be considered from this result, in the phosphor obtained from this embodiment, the phase different from the conventionally reported crystal phase is generated, although the crystal system is the same. In addition, in order to obtain the strong emission intensity, from the analysis result of the sample 12, it was found that preferably the diffraction pattern is close to the diffraction pattern obtained from the analysis result, and no diffraction peak of the impurity phase exists, which is observed in the Bragg angle range from 26° to 33°, 38.7° to 39.7°, and 42.0° to 42.8°.

Specifically, in the sample according to the present invention, the highest emission intensity is exhibited in near the range from b/m=6 to b/m=7. This is because when the b/m ratio is in the range from b/m=6 to b/m=7, the phase having the emission spectrum with a peak in the wavelength range from 400 nm to 500 nm can be obtained as almost a single phase, and the impurity phase can be prevented from generating, with the b/m ratio largely deviated from the range from b/m=6 to b/m=7. When the sample after firing is observed, the whole body of the sample of the b/m=6 and b/m=7 is almost white. However, impurity phases of yellow color and orange color can be confirmed in other samples. (when the sample is irradiated with the light of 405 nm as the excitation light, blue color emission occurs in a part of white color, and yellow color emission and orange color emission occur in the parts of yellow color and orange color, respectively.) However, it should be noted that it is not always appropriate to set the b/m ratio in the range from b/m=6 to b/m=7, but when the a/m ratio is changed, a proper value of the b/m ratio is also slightly changed. This is because the phosphor of the present invention is basically constituted by assembling a network by (SiN4), and it appears that a part of Si site is replaced with Al. Therefore, when an amount of replacement by Al is changed, an amount of Si also needs to be slightly changed so as to obtain the structure suitable for light emission.

Example 3

Samples 15 to 23 were manufactured in such a manner that the molar ratio of Sr, Al, and Si was fixed to 1, 1, 7, respectively and an o/m ratio was changed, and the raw materials were then fired at 1800° C., and the emission intensity was measured, in the phosphor expressed by the composition formula $SrAlSi_{7.0}O_oN_n$:Eu(Eu/(Sr+Eu)=0.030, n=(2/3)m+a+(4/3)b−(2/3)o, m=1, a=1, and b=7). In the manufacture of each sample, the commercially available $Sr_3N_2$(2N), $SrCO_3$ (3N), $Al_2O_3$(3N), AlN(3N), $Si_3N_4$(3N), and $Eu_2O_3$(3N) were prepared as the raw materials, and in the same way as the sample 1 of the example 1, the phosphor sample was manufactured excepting that the mixing ratio of each raw material was adjusted to a predetermined o/m ratio. However, the o/m ratio thus adjusted was set at o/m=0 (sample 15), o/m=0.50 (sample 16), o/m=0.75 (sample 17), o/m=1.00 (sample 18), o/m=1.25 (sample 19), o/m=1.50 (sample 20), o/m=1.75 (sample 21), o/m=2.00 (sample 22), and o/m=2.50 (sample 23).

Figure 4:
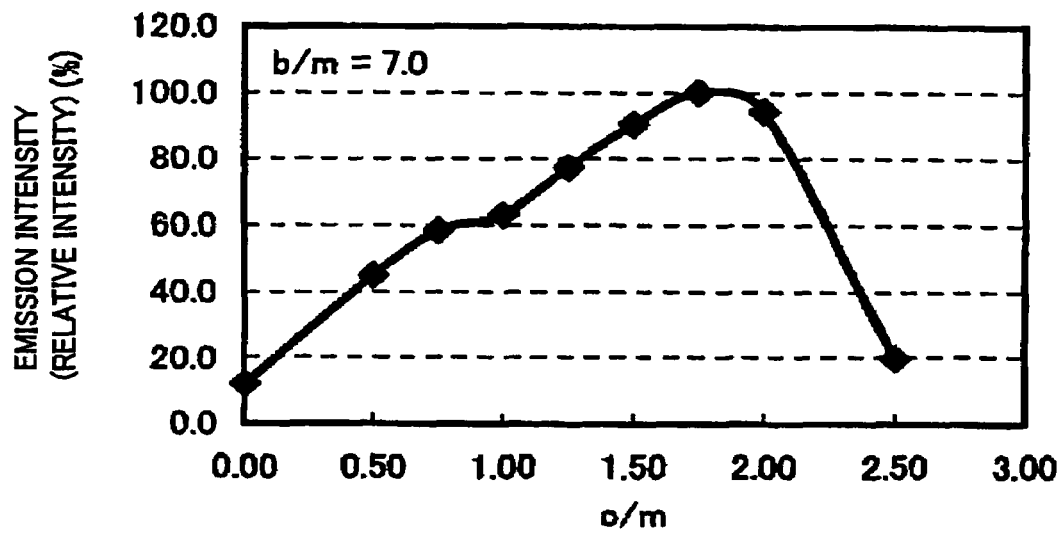
FIG. 4 is a graph showing the measurement result obtained by measuring the emission intensity of each phosphor of samples 15 to 23 of an example 3.

The peak wavelength and the emission intensity were measured for the samples 15 to 23 thus manufactured. The measurement result is shown in table 3 and FIG. 4. Here, FIG. 4 is a graph showing the relative intensity of the emission intensity of the phosphor sample taken on the ordinate axis, and the value of the o/m ratio taken on the abscissa axis. As the emission intensity, the value of the emission intensity in the peak wavelength of o/m=1.75 (sample 21) was defined as 100%. The light with the wavelength of 405 nm was used as the excitation light.

As clearly shown in the result of the table 3 and FIG. 4, the emission intensity of each phosphor becomes stronger, as the value of the o/m ratio becomes larger, showing the highest emission intensity in the vicinity of o/m=1.75, and is decreased when the value of the o/m ratio becomes 01.75 or more.

The emission intensity was examined when the o/m ratio was changed in the sample of b/m=7 which exhibits the most excellent emission intensity among the samples 7 to 14 of the example 2, and the result of the examination is shown in the samples 15 to 23. Then, it was found that the phosphor showing the excellent emission intensity could be obtained by optimizing not only the b/m ratio but also the o/m ratio. In the samples 7 to 14 of the example 2, the most excellent emission intensity is exhibited in the sample of b/m=7, and o/m=1. However, it was found that the emission intensity was further improved by about 30%, by setting the b/m ratio and the o/m ratio at b/m=7 and o/m=1.75, respectively in the samples 15 to 23 of the example 3. Although the detailed reason is unknown, an ion radius and an electric charge of Al, Si, O, and N have an influence on improving the emission intensity described above. The reason is considered in such a way that although deformation of the crystal structure occurs in association with the collapse of the balance of the electric charge by replacing a part of the Si site with Al having+tervalent valency and larger ion radius than that of Si having+tetravalent valency, by replacing a part of N site having–tervalent valency with o having–bivalent valency and smaller ion radius than that of N to alleviate the deformation, the balance of the electric charge is maintained and the crystal structure suitable for the light emission is obtained.

peak wavelength of o/m=1.25 (sample 28) was defined as 100%. The light with the wavelength of 405 nm was used as the excitation light.

Figure 5:
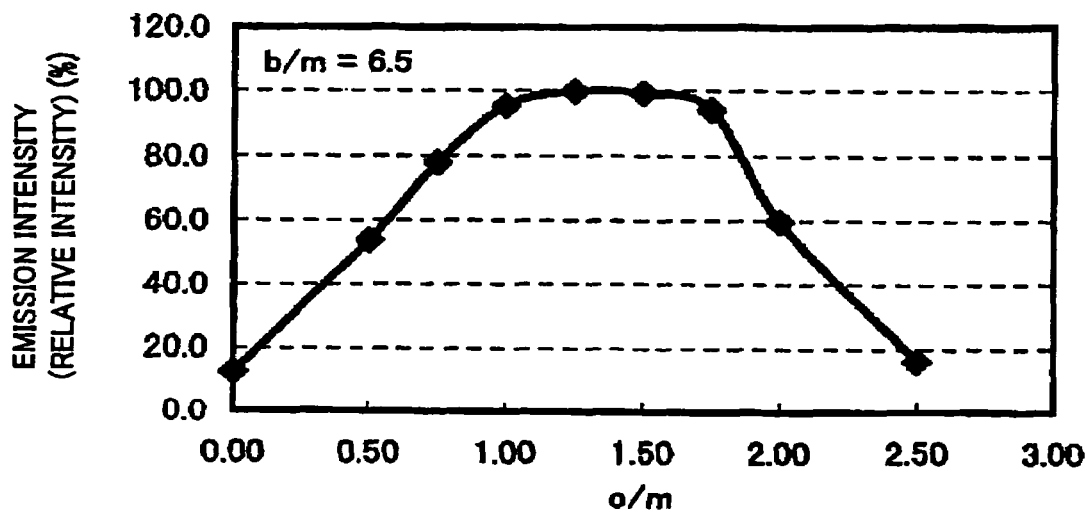
FIG. 5 is a graph showing the measurement result obtained by measuring the emission intensity of each phosphor of samples 15 to 32 of an example 4.

As clearly shown from the result of the table 4 and FIG. 5, the emission intensity of each phosphor becomes stronger, as the value of the o/m ratio becomes larger, showing the highest

TABLE 3

| | COMPOSITION FORMULA | Eu/(Sr + Eu) | o/m | EXCITATION WAVELENGTH (nm) | PEAK WAVELENGTH (nm) | EMISSION INTENSITY (%) |
|---|---|---|---|---|---|---|
| SAMPLE 15 | $SrAlSi_{7.0}N_{11.00}$:Eu | 0.030 | 0.00 | 405 | 460.9 | 11.9 |
| SAMPLE 16 | $SrAlSi_{7.0}O_{0.50}N_{10.67}$:Eu | 0.030 | 0.50 | 405 | 459.9 | 44.9 |
| SAMPLE 17 | $SrAlSi_{7.0}O_{0.75}N_{10.50}$:Eu | 0.030 | 0.75 | 405 | 458.2 | 58.4 |
| SAMPLE 18 | $SrAlSi_{7.0}O_{1.00}N_{10.33}$:Eu | 0.030 | 1.00 | 405 | 459.9 | 63.1 |
| SAMPLE 19 | $SrAlSi_{7.0}O_{1.25}N_{10.17}$:Eu | 0.030 | 1.25 | 405 | 456.0 | 77.4 |
| SAMPLE 20 | $SrAlSi_{7.0}O_{1.50}N_{10.00}$:Eu | 0.030 | 1.50 | 405 | 453.0 | 90.5 |
| SAMPLE 21 | $SrAlSi_{7.0}O_{1.75}N_{9.83}$:Eu | 0.030 | 1.75 | 405 | 451.4 | 100.0 |
| SAMPLE 22 | $SrAlSi_{7.0}O_{2.00}N_{9.67}$:Eu | 0.030 | 2.00 | 405 | 449.1 | 94.3 |
| SAMPLE 23 | $SrAlSi_{7.0}O_{2.50}N_{9.33}$:Eu | 0.030 | 2.50 | 405 | 451.4 | 19.7 |

Example 4

Samples 24 to 32 were manufactured in such a manner that the molar ratio of Sr, Al, and Si was fixed to 1, 1, 6.5, respectively and an o/m ratio was changed, and the raw materials were then fired at 1800° C. and the emission intensity was measured, in the phosphor expressed by the composition formula $SrAlSi_{6.5}O_oN_n$:Eu(Eu/(Sr+Eu)=0.030, n=(2/3)m+a+(4/3)b−(2/3)o, m=1, a=1, and b=6.5). In the manufacture of each sample, the commercially available $Sr_3N_2$(2N), $SrCO_3$ (3N), $Al_2O_3$(3N), AlN(3N), $Si_3N_4$(3N), $Si_3N_4$(3N), and $Eu_2O_3$(3N) were prepared as the raw materials, and in the same way as the sample 1 of the example 1, the phosphor sample was manufactured excepting that the mixing ratio of each raw material was adjusted to a predetermined o/m ratio. Specifically, the o/m ratio thus adjusted was set at o/m=0 (sample 24), o/m=0.50 (sample 25), o/m=0.75 (sample 26), o/m=1.00 (sample 27), o/m=1.25 (sample 28), o/m=1.50 (sample 29), o/m=1.75 (sample 30), o/m=2.00 (sample 31), and o/m=2.50 (sample 32).

The peak wavelength and the emission intensity were measured for the samples 24 to 32 thus manufactured. The measurement result is shown in table 4 and FIG. 5. Here, FIG. 5 is a graph showing the relative intensity of the emission intensity of the phosphor sample taken on the ordinate axis, and the value of the o/m ratio taken on the abscissa axis. As the emission intensity, the value of the emission intensity in the emission intensity near the range from o/m=1.00 to o/m=1.75, and is decreased when the value of the o/m ratio becomes 1.75 or more.

Specifically, in the samples 24 to 32, the b/m ratio in the composition formula of the samples 15 to 23 of the example 3 is changed from b/m=7 to b/m=6.5. Then, it is found from the result of the table 4 and FIG. 5, that when the b/m ratio is changed an optimal o/m ratio is also changed. Although the detailed reason is not unknown, as described in a part of the samples 15 to 23 of the example 3, it appears that the balance of Al, Si, O, and N in the structure is important. Also, there is a possibility that the melting point is changed depending on the oxygen concentration, and this contributes to accelerating the solid phase reaction and improving the crystallinity.

TABLE 4

| | COMPOSITION FORMULA | Eu/(Sr + Eu) | o/m | EXCITATION WAVELENGTH (nm) | PEAK WAVELENGTH (nm) | EMISSION INTENSITY (%) |
|---|---|---|---|---|---|---|
| SAMPLE 24 | $SrAlSi_{6.5}N_{10.33}$:Eu | 0.030 | 0.00 | 405 | 460.9 | 12.5 |
| SAMPLE 25 | $SrAlSi_{6.5}O_{0.50}N_{10.00}$:Eu | 0.030 | 0.50 | 405 | 459.9 | 53.8 |
| SAMPLE 26 | $SrAlSi_{6.5}O_{0.75}N_{9.83}$:Eu | 0.030 | 0.75 | 405 | 455.9 | 78.0 |
| SAMPLE 27 | $SrAlSi_{6.5}O_{1.00}N_{9.67}$:Eu | 0.030 | 1.00 | 405 | 455.5 | 95.5 |
| SAMPLE 28 | $SrAlSi_{6.5}O_{1.25}N_{9.50}$:Eu | 0.030 | 1.25 | 405 | 455.5 | 100.0 |
| SAMPLE 29 | $SrAlSi_{6.5}O_{1.50}N_{9.33}$:Eu | 0.030 | 1.50 | 405 | 450.3 | 99.4 |
| SAMPLE 30 | $SrAlSi_{6.5}O_{1.75}N_{9.17}$:Eu | 0.030 | 1.75 | 405 | 448.6 | 94.3 |
| SAMPLE 31 | $SrAlSi_{6.5}O_{2.00}N_{9.00}$:Eu | 0.030 | 2.00 | 405 | 447.5 | 59.7 |
| SAMPLE 32 | $SrAlSi_{6.5}O_{2.50}N_{8.67}$:Eu | 0.030 | 2.50 | 405 | 449.7 | 16.2 |

Example 5

Samples 33 to 37 were manufactured by the following procedure. In the samples 33 to 37, the variation of the emission intensity was measured, when the concentration of the element Z, e.g. activator (Eu) was changed in the phosphor expressed by the composition formula $Sr_mAlSi_{6.5}O_{1.25}N_{9.50}$:$Eu_z$ (m+z=1). Here, in the manufacture of the measurement sample, the mixing ratio of the raw materials of Sr and Eu was adjusted, so that the relation between the activator Eu and Sr becomes m+z=1. Then, as explained in the sample 28 of the example 4, in the same way as the sample 28 excepting that the mixing ratio of each raw material of $SrCO_3$(3N), AlN (3N), $Si_3N_4$(3N), and $Eu_2O_3$ (3N) was adjusted and Eu activating concentration was changed, the samples 33 to 37 were manufactured, and the emission intensity of the phosphor thus manufactured was measured. Specifically, the Eu activating concentration Eu/(Sr+Eu) was set at 0.001 (sample 33), 0.005 (sample 34), 0.020 (sample 35), 0.050 (sample 36), and 0.100 (sample 37).

Figure 6:
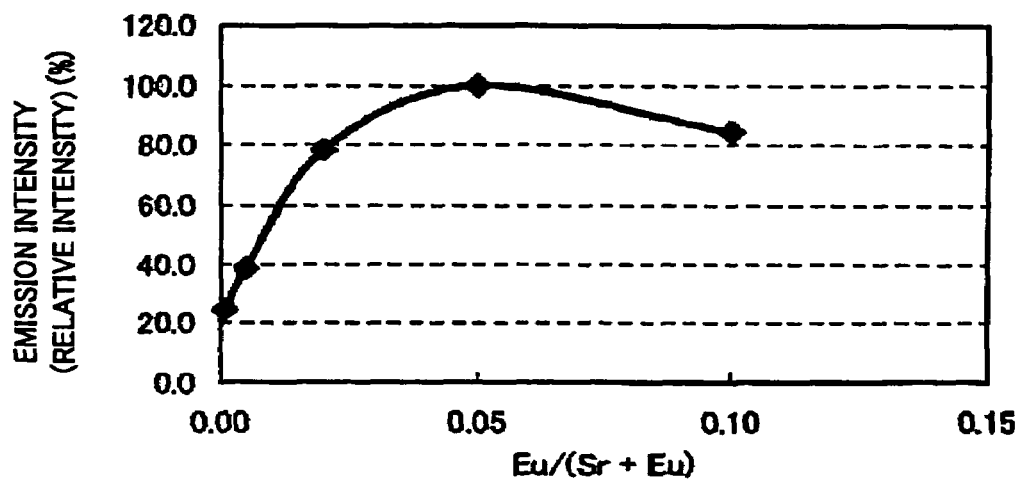
FIG. 6 is a graph showing the measurement result obtained by measuring the emission intensity of each phosphor of samples 24 to 37 of an example 5.

The measurement result is shown in table 5 and FIG. 6. Here, FIG. 6 is a graph showing the relative intensity of the emission intensity of each phosphor sample taken on the ordinate axis, and the value of the blending ratio Eu/(Sr+Eu) of Sr and Eu taken on the abscissa axis. In the emission intensity and luminance, the value of the emission intensity in the peak wavelength of Eu/(Sr+Eu)=0.050 (sample 36) was defined as 100%. The light with the wavelength of 405 nm was used as the excitation light.

As clearly shown from the result of the table 5 and FIG. 6, although the emission intensity is increased along with the increase in the value of Eu/(Sr+Eu) in the region where the value of the Eu/(Sr+Eu) is small, the emission intensity is decreased along with the increase in the value of the Eu/(Sr+Eu), with the peak in the vicinity of Eu/(Sr+Eu)=0.050. The reason is considered to be such that an activator element is insufficient in a part where the value of Eu/(Sr+Eu) is smaller than Eu/(Sr+Eu)=0.050. Therefore, in the part where the value of Eu/(Sr+Eu) is larger than Eu/(Sr+Eu)=0.050, distance between activator elements becomes short, and concentration quenching occurs.

Meanwhile, as clearly shown from the result of the table 5, it was confirmed that the value of the peak wavelength of the emission spectrum was shifted toward the longer wavelength side, along with the increase in the value of the Eu/(Sr+Eu).

Comparative Example 2

In the comparative example 2, the commercially available phosphor $BaMgAl_{10}O_{17}$:Eu (BAM:Eu) used at present as the blue phosphor of the white LED illumination manufactured by combining the near ultraviolet/ultraviolet LED and R, G, B and other phosphor was purchased, and the peak wavelength, the emission intensity, and the excitation spectrum were measured.

Figure 7:
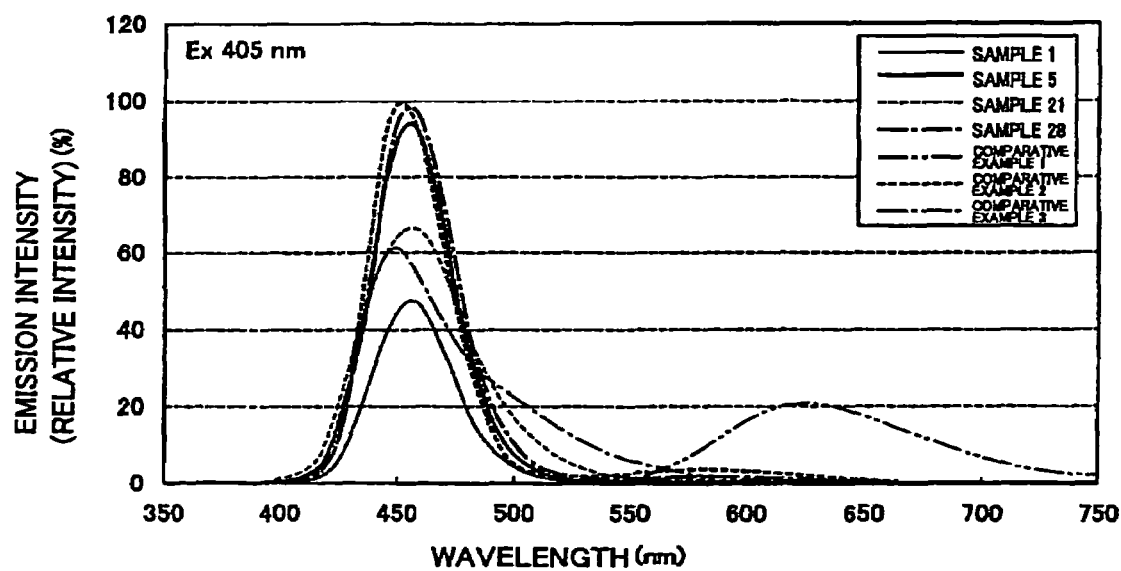
FIG. 7 is a graph showing an emission spectrum of each phosphor of sample 1, sample 5, sample 21, and sample 28 and comparative examples 1, 2, and 3.
Figure 8:
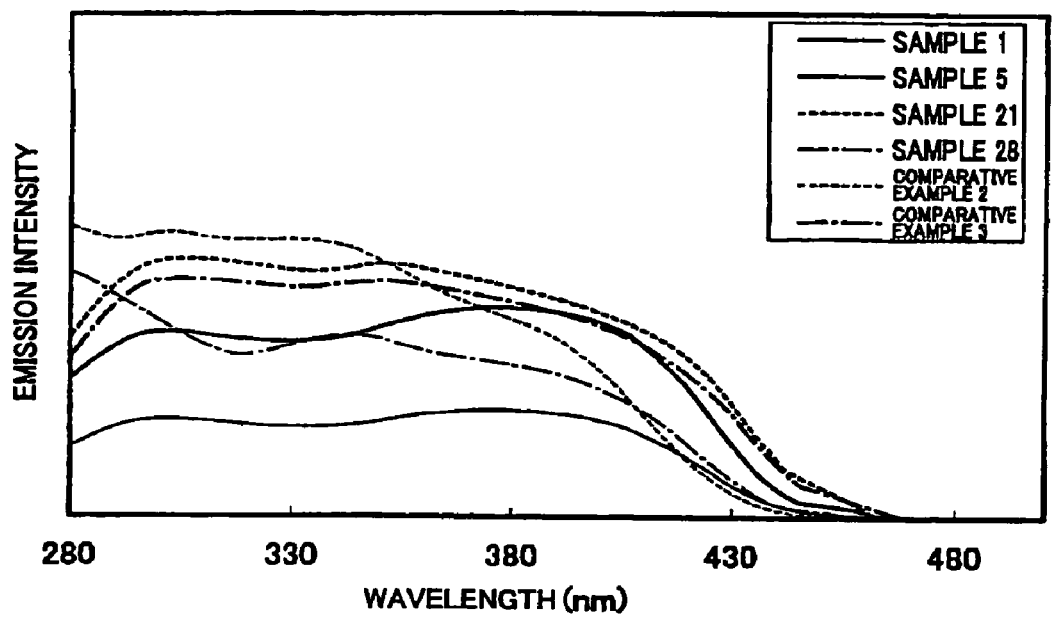
FIG. 8 is a graph showing an excitation spectrum of each phosphor of sample 1, sample 5, sample 21, sample 28, and comparative example 2 and comparative example 3.

The measurement result is shown in the table 6, the emission spectrum is shown in FIG. 7, and the excitation spectrum is shown in FIG. 8 (as will be described later). Note that the light with the wavelength of 405 nm was used as the excitation light. Here, in the excitation spectrum, the phosphor to be measured was excited by using a monochromatic light of various wavelengths as the excitation light, then the emission intensity of the light of a predetermined wavelength which is emitted by the phosphor was measured, and an excitation wavelength dependence of the emission intensity was measured. In such a measurement, the phosphor of the comparative example 2 was irradiated with the monochromatic light with the wavelength range from 280 nm to 500 nm, and the excitation dependence of the emission intensity of the light with the wavelength of 455.6 nm, which was emitted by the phosphor, was measured.

Comparative Example 3

In the comparative example 3, the commercially available $(Sr, Ca, Ba, Mg)_{10}(PO_4)_6Cl_2$:Eu phosphor which was used at present as the blue phosphor of the white LED illumination manufactured by combining the near ultraviolet/ultraviolet

TABLE 5

| | COMPOSITION FORMULA | Eu/(Sr + Eu) | EXCITATION WAVELENGTH (nm) | PEAK WAVELENGTH (nm) | EMISSION INTENSITY (%) |
|---|---|---|---|---|---|
| SAMPLE 33 | $SrAlSi_{6.5}O_{1.25}N_{9.50}$:Eu | 0.001 | 405 | 448.6 | 24.8 |
| SAMPLE 34 | | 0.005 | 405 | 452.9 | 38.7 |
| SAMPLE 35 | | 0.020 | 405 | 453.6 | 78.5 |
| SAMPLE 36 | | 0.050 | 405 | 454.2 | 100.0 |
| SAMPLE 37 | | 0.100 | 405 | 462.3 | 84.5 |

Comparative Example 1

In the comparative example 1, the phosphor sample was manufactured in the same way as the sample 1 of the example 1, excepting that the firing temperature was set at 1550° C.

The peak wavelength and the emission intensity were measured for the sample of the comparative example 1 thus manufactured. The measurement result is shown in table 6 and the emission spectrum is shown in FIG. 7 (as will be described later). The light with the wavelength of 405 nm was used as the excitation light. Here, the emission spectrum means the spectrum of the light released by the phosphor, when the phosphor is irradiated with the light of some wavelength or energy.

LED and R, G, B and other phosphor was purchased, and the peak wavelength, the emission intensity, and the excitation spectrum were measured. The measurement result is shown in the table 6, the emission spectrum is shown in FIG. 7, and the excitation spectrum is shown in FIG. 8. The light with the wavelength of 405 nm was used as the excitation light.

In the measurement of the excitation spectrum, the phosphor was irradiated with the monochromatic light in the wavelength range from 280 nm to 500 nm, and the excitation dependence of the emission intensity of the light with the peak wavelength of 448.7 nm, which was emitted by the phosphor, was measured.

TABLE 6

|   |   | COMPOSITION FORMULA | z/(m + z) | FIRING CONDITION | EXCITATION WAVE-LENGTH (nm) | PEAK WAVE-LENGTH (nm) | EMISSION INTENSITY (%) |
|---|---|---|---|---|---|---|---|
| EXAMPLE 6 | SAMPLE 1 | $SrSi_{7.0}N_{10.0}$:Eu | 0.030 | 1800° C. × 3 h, $N_2$ ATMOSPHERE | 405 | 455.9 | 47.7 |
|  | SAMPLE 5 | $SrSi_{7.0}O_{1.25}N_{9.17}$:Eu | 0.030 | 1800° C. × 3 h, $N_2$ ATMOSPHERE | 405 | 455.5 | 94.3 |
|  | SAMPLE 21 | $SrAlSi_{7.0}O_{1.75}N_{9.83}$:Eu | 0.030 | 1800° C. × 3 h, $N_2$ ATMOSPHERE | 405 | 451.4 | 100.0 |
|  | SAMPLE 28 | $SrAlSi_{6.5}O_{1.25}N_{9.50}$:Eu | 0.030 | 1800° C. × 3 h, $N_2$ ATMOSPHERE | 405 | 455.5 | 98.7 |
|  | COMPARATIVE EXAMPLE 1 | $SrSi_{7.0}N_{10.0}$:Eu | 0.030 | 1550° C. × 3 h, $N_2$ ATMOSPHERE | 405 | 625.6 | 21.1 |
|  | COMPARATIVE EXAMPLE 2 | $BaMgAl_{10}O_{17}$:Eu (COMMERCIALLY AVAILABLE PRODUCT) | — | — | 405 | 455.6 | 66.5 |
|  | COMPARATIVE EXAMPLE 3 | $(Sr, Ca, Ba, Mg)_{10}(PO_4)_6Cl_2$:Eu (COMMERCIALLY AVAILABLE PRODUCT) | — | — | 405 | 448.7 | 61.5 |

Example 6

In the example 6, in regards to (comparative example 1), or the blue phosphor (comparative example 2 and comparative example 3) used at present as the white LED illuminating blue phosphor and a typical phosphor obtained by the aforementioned example, e.g. the samples 1 and 5 of the example 1, the sample 21 of the example 3, and the sample 28 of the example 4, the peak wavelength, the emission intensity, the excitation spectrum, and the X-ray diffraction pattern by the powder method or the like were measured and compared.

The measurement result is shown in the table 6, the emission spectrum is shown in FIG. 7, and the excitation spectrum is shown in FIG. 8. Here, FIG. 7 and FIG. 8 are graphs showing the relative intensity of the emission intensity of each phosphor sample taken on the ordinate axis, and the wavelength of the light taken on the abscissa axis. In the emission intensity of the table 6 and the emission spectrum of FIG. 7, the values of the emission intensity and the emission spectrum in the peak wavelength of the phosphor obtained by the sample 21 of the example 3 were defined as 100%. The light with the wavelength of 405 nm was used as the excitation light.

FIG. 7 is a graph showing the spectrum of the light emitted from each phosphor, when each phosphor of the samples 1 and 5 of the example 1, the sample 21 of the example 3, the sample 28 of the example 4, the comparative example 1, the comparative example 2, and the comparative example 3 is irradiated with the monochromatic light with the wavelength of 405 nm as the excitation light.

In FIG. 8, each phosphor of the sample 1 and the sample 5 of the example 1, the sample 21 of the example 3, the sample 28 of the example 4, the comparative example 2, and the comparative example 3 is irradiated with the monochromatic light in the wavelength range from 280 nm to 500 nm, and the excitation spectrum is shown, wherein an excitation dependence of the emission intensity of the light is measured, the light having a peak wavelength for emitting light when each phosphor is irradiated with the monochromatic light with the wavelength of 405 nm.

As clearly shown from the result of the table 6, FIG. 7, and FIG. 8, it is found that each phosphor of the sample 5 of the example 1, the sample 21 of the example 3 and the sample 28 of the example 4 has about 30% stronger emission intensity than those of $BaMgAl_{10}O_{17}$:Eu (BAM:Eu) of the comparative example 2 and $(Sr, Ca, Ba, Mg)_{10}(PO_4)_6Cl_2$:Eu phosphor of the comparative example 3 used at present as the white LED illuminating blue phosphor when irradiated with the light with the wavelength of 405 nm, and has an excellent excitation band slightly on the longer wavelength side, particularly in the wavelength range from 300 nm to 430 nm, because a ratio of covalent bond is higher than that of $BaMgAl_{10}O_{17}$:Eu (comparative example 2) e.g. oxide phosphor, and $(Sr, Ca, Ba, Mg)_{10}(PO_4)_6Cl_2$:Eu (comparative example 3), e.g. halophosphate phosphor.

The example 6 will be specifically compared and studied hereunder.

1) Examination on the sample 1 of the example 1 and the comparative example 1

Figure 9:
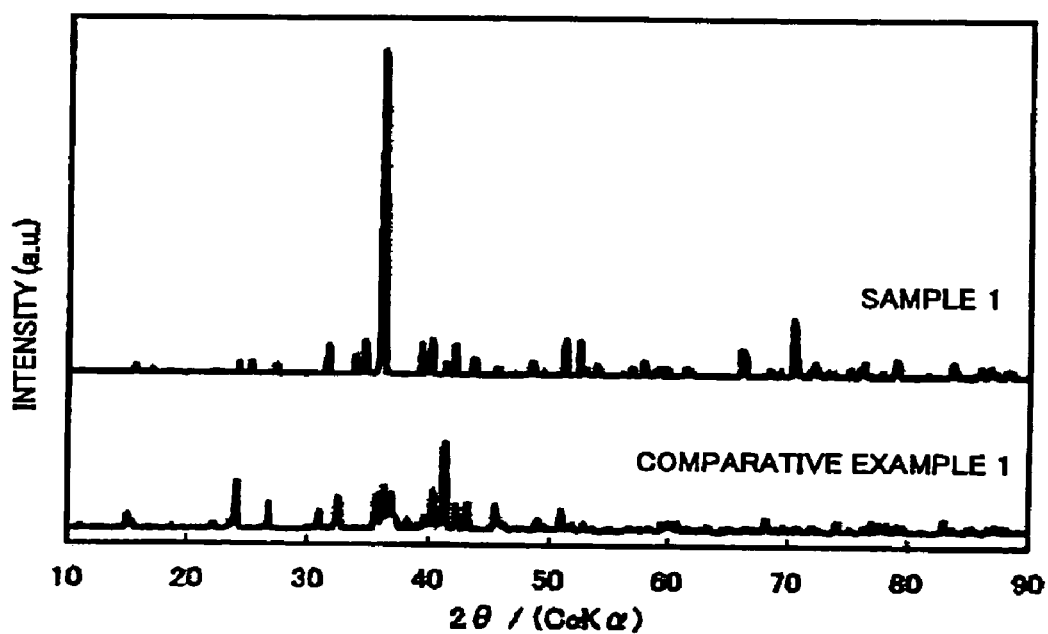
FIG. 9 is a graph showing the measurement result of the X-ray diffraction pattern by the powder method of the phosphor of the sample 1 and the comparative example 1.

In the sample 1 of the example 1, and the comparative example 1, the composition formula $SrSi_7N_{10}$:Eu (wherein Eu/(Sr+Eu)=0.030) was manufactured at different firing temperature. FIG. 9 is a graph showing the measurement result of the X-ray diffraction pattern of the phosphor by the powder method in the sample 1 and the comparative example 1.

As clearly shown from the result of the table 6, FIG. 7, and FIG. 9, the phosphor showing absolutely different characteristics was generated at the firing temperature of 1550° C. and 1800° C., and it was found that the phosphor according to the present invention was hardly generated at 1550° C. When firing at 1800° C. (sample 1), as shown in FIG. 7, the emission spectrum with a peak in the wavelength range from 400 nm to 500 nm is observed. However, when firing at 1550° C. (comparative example 1), the emission spectrum with a peak in the wavelength range from 400 nm to 500 nm can not be confirmed, but the emission spectrum with a peak at the wavelength of 625 nm or around can be observed. Further, as shown in FIG. 9, a typical diffraction peak of the phase showing the emission spectrum with a peak in the wavelength range from 400 nm to 500 nm as shown in the sample 1 can not be confirmed from the diffraction pattern of the comparative example 1, or even if it can be confirmed, the intensity is significantly weak. Accordingly, when taking an intensity ratio of the X-ray diffraction peak into consideration, the generation of the phase (sample 1) of the phosphor according to the present invention is within 50%.

Similarly, when the firing temperature is 1550° C. or less, it appears that the phase of the phosphor (sample 1) according to the present invention having the emission spectrum with a peak in the wavelength range from 400 nm to 500 nm is not generated.

2) Examination on the sample 5 of the example 1, sample 21 of the example 3, sample 28 of the example 4 and comparative example 2 and comparative example 3

As clearly shown from the result of the table 6 and FIG. 7, the phosphor of the sample 5 of the example 1, the sample 21 of the example 3, and the sample 28 of the example 4 exhibited the emission spectrum with a peak in the wavelength range from 400 nm to 500 nm when it was irradiated with the light with the wavelength of 405 nm. Then, it was found that the aforementioned phosphor was an excellent phosphor, having about 30% stronger emission intensity than the phosphor $BaMgAl_{10}O_{17}$:Eu(commercially available BAM:Eu) of the comparative example 2 used as a white LED illuminating blue phosphor at present and the phosphor $(Sr, Ca, Ba, Mg)_{10}(PO_4)_6Cl_2$:Eu (commercially available SCAP) of the comparative example 3. Therefore, by using the aforementioned phosphor as a blue phosphor of the white LED illumination manufactured by combining the near ultraviolet/ultraviolet LED and the R, G, B and other phosphor, the white LED illumination with higher luminance can be obtained.

In addition, as shown in FIG. 8, it was found that each phosphor of the sample 5, the sample 21, and the sample 28 had an excellent excitation band on the longer wavelength side, and particularly had an excellent excitation band in the wavelength range from 300 nm to 430 nm, because a ratio of covalent bond was higher than that of $BaMgAl_{10}O_{17}$:Eu (comparative example 2), e.g. oxide phosphor, and $(Sr, Ca, Ba, Mg)_{10}(PO_4)_6Cl_2$:Eu(comparative example 3), e.g. halophosphate phosphor. Therefore, when the white LED illumination is manufactured by combining the near ultraviolet/ultraviolet LED, the variance in the color tone of the white light due to the variance in the emission wavelength of the near ultraviolet/ultraviolet LED can be suppressed.

3) Examination on the X-Ray diffraction pattern by a powder method of the sample 1 and the sample 5 of the example 1, the sample 21 of the example 3, and the sample 28 of the example 4

Figure 10:
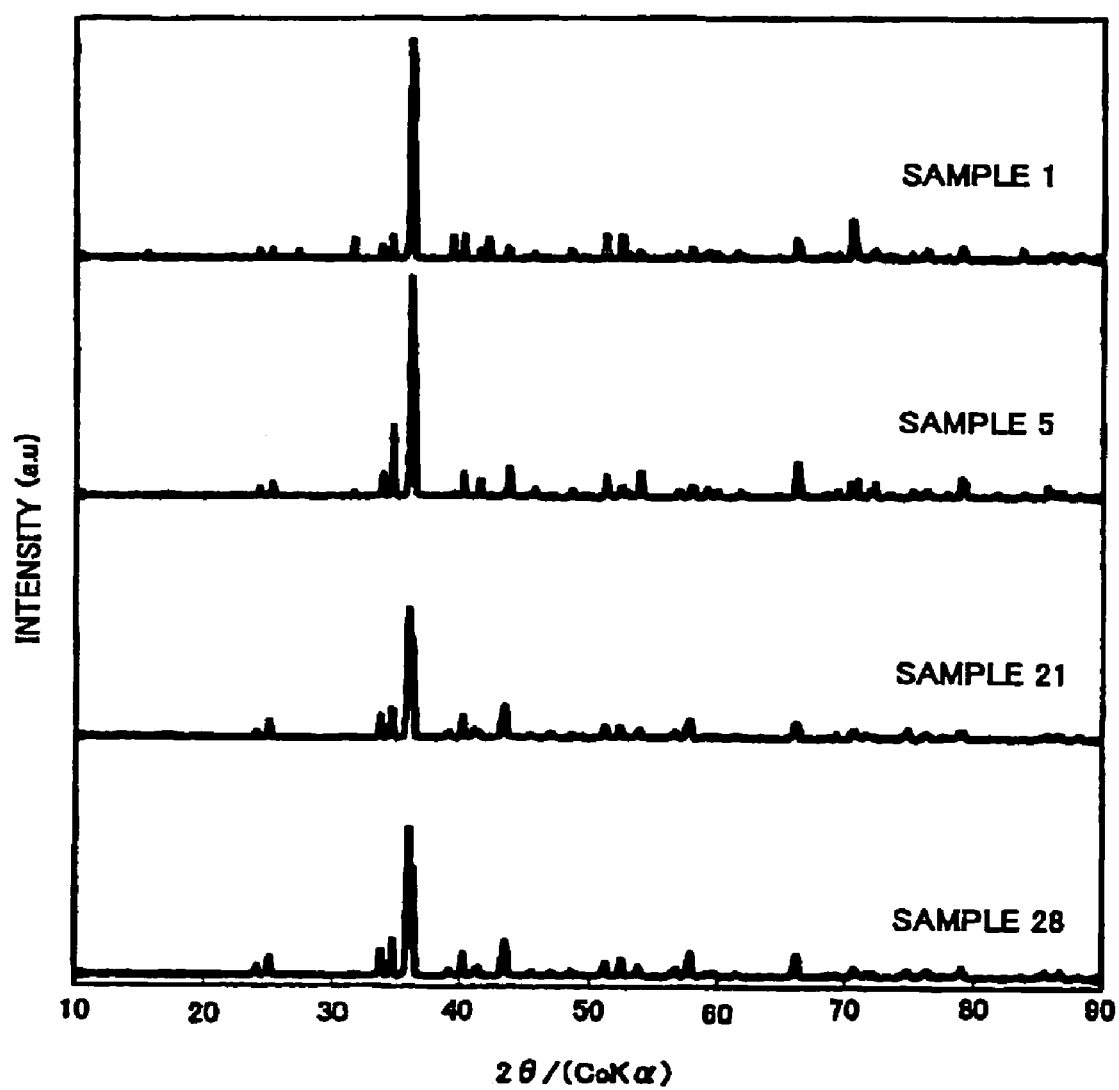
FIG. 10 is a graph showing the measurement result of the X-ray diffraction pattern by the powder method of each phosphor of the sample 1, sample 5, sample 21, and sample 28.

Here, by comparing with the X-ray diffraction pattern by the powder method of each phosphor of the sample 8, the sample 10, the sample 12, and the sample 14 shown in FIG. 3, the examination was performed for the X-ray diffraction pattern by the powder method of the sample 1, the sample 5, the sample 21, and the sample 28 shown in FIG. 10.

As clearly shown from the result of FIG. 3 and FIG. 10, each phosphor of the example 1, the example 5, the example 10, the example 12, the example 14, the example 21, and the example 28 show a diffraction peak with highest intensity in the Bragg angle (2θ) range from 35° to 37° in the X-ray diffraction pattern by the powder method using the CoKα ray. Further, two, two, one and one characteristic diffraction peaks are observed in the Bragg angle (2θ) range from 23.6° to 25.6°, 33° to 35°, 39.7°, to 40.7°, and 43° to 44° of the X-ray diffraction pattern by the powder method. When the relative intensity of the diffraction peak with highest intensity, which is observed in the Bragg angle (2θ) range from 35° to 37°, is defined as 100%, the relative intensity of such a diffraction peak shows the diffraction peak of not less than 2.0% and not more than 40%.

In addition, in the X-ray diffraction pattern by the powder method of each phosphor of the sample 1, the sample 5, the sample 10, the sample 12, the sample 14, the sample 21, and the sample 28, the smaller the diffraction peak intensity is in the Bragg angle (2θ) range from 26°to 33°, 38.7° to 39.7°, and 42.0° to 42.8°, the more preferable it is. Particularly, when the relative intensity of the diffraction peak with highest intensity observed in the Bragg angle (2θ) range from 35° to 37° is defined as 100%, preferably there is no diffraction peak with relative intensity of 10% or more. From the analysis result of a crystal phase, the phase showing the diffraction peak observed in the above range is considered to be an impurity phase different from the phase having the emission spectrum with a peak in the wavelength range from 400 nm to 500 nm.

Further, when the diffraction peak with highest intensity in the Bragg angle (2θ) range from 35° to 37° is focused in the X-ray diffraction pattern by the powder method using the CoKα ray, it is found that there are two peaks by containing Al in the constituent element as shown in each phosphor of the sample 10, the sample 12, the sample 14, the sample 21, and the sample 28. Also it is found that the emission characteristic is more excellent in the phosphor having two peaks, with Al added thereto.

Figure 11:
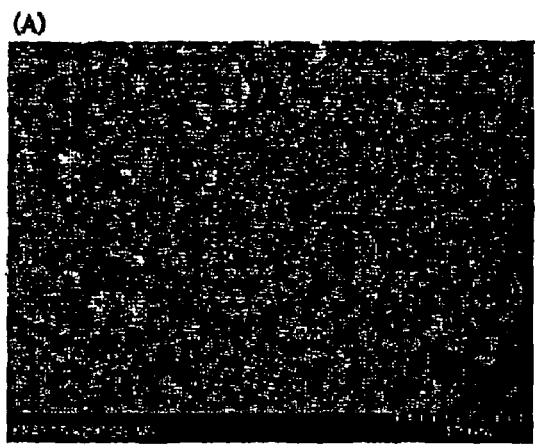
FIG. 11 is an SEM photograph showing a phosphor powder of the sample 28.
Figure 11:
Figure 12:
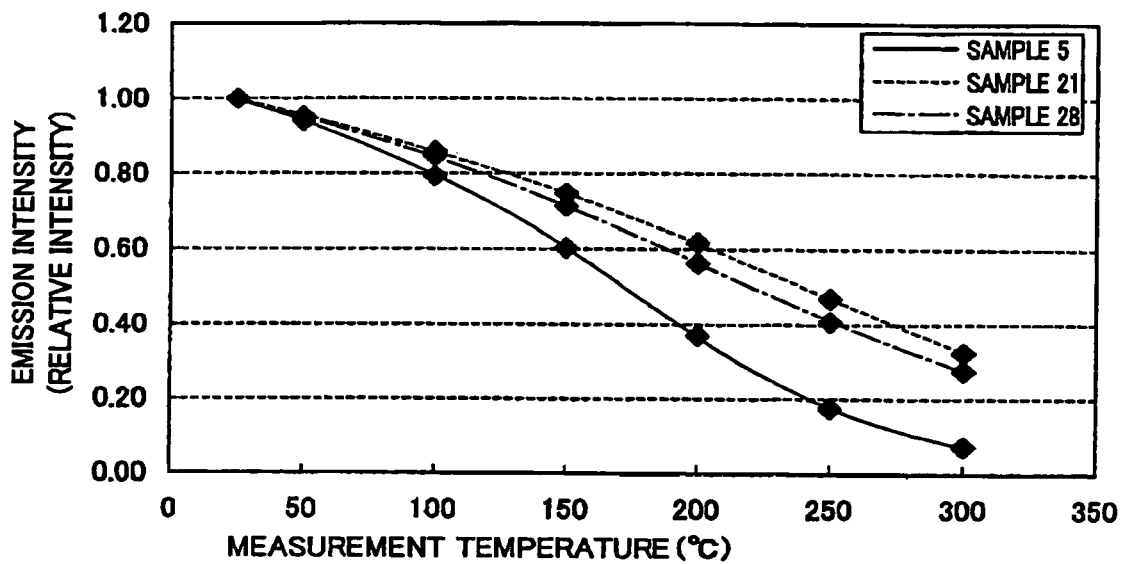
FIG. 12 is a graph showing temperature characteristics of the emission intensity of each phosphor of the sample 5, sample 21, and sample 28.

4) Examination on an Analysis Result of the Sample 5 of the Example 1, the Sample 21 of the Example 3, and the Sample 28 of the Example 4, SEM Photograph, and Temperature Characteristics Finally, results of a composition analysis, an average particle size, and a specific surface area of each phosphor of the sample 5, the sample 21, and the sample 28 are shown in table 7, the SEM photograph of the sample 28 is shown in FIG. 11, the result of the temperature characteristics of the sample 5, the sample 21, and the sample 28 are shown in table 8 and FIG. 12. Here, the magnification of the photograph is 250 and 1000 for FIG. 11A and FIG. 11B, respectively.

Although the result of the composition analysis did not completely match a theoretical value obtained from an atomic amount of the constituent element and the molar ratio, an almost equal value was obtained. It appears that a slight deviation occurs due to a measurement error and impurities mixed-in during manufacturing the phosphor.

When the average particle size (D50) is measured by a laser Doppler measurement method for the samples 5, 21, and 28, any of the above samples is sized at not less than 1.0 μm and not more than 20.0 μm. Then, when the above samples are formed into a paste and applied on various places, the coating density can be increased, to thereby realize a coating film having high emission intensity and luminance. Moreover, as clearly shown in the SEM photograph of FIG. 11, the phosphor powder thus obtained contains a primary particle with particle size of 20.0 μm or less, and an aggregate in which the primary particles are aggregated each other. Thus, it is found that the aforementioned phosphor powder contains the primary particle and the aggregate thereof.

Table 8 and FIG. 12 show the result of measuring the temperature characteristic of the emission intensity of the sample 5, the sample 21, and the sample 28 at temperature from 25° C. to 300° C.

First, explanation will be given to the measurement of the emission intensity $P_{25}$ at temperature of 25° C., emission intensity $P_T$ at temperature of T° C., and the variation of the emission intensity.

The emission intensity $P_{25}$ is obtained by placing the phosphor at an environment of 25° C., and measuring the spectrum of the light emitted from the phosphor under the excitation light of a predetermined wavelength as will be described later. The peak having a maximum intensity in the spectrum thus measured is defined as the maximum peak, and the relative intensity of the peak is defined as $P_{25}$ and its value is set at 1.0. Next, the temperature of the phosphor is increased from 25° C. to place the phosphor in an environment of T° C. Then, the phosphor is irradiated with the same excitation light as that used for measuring the spectrum at 25° C., whereby the spectrum of the light emitted from the phosphor is measured. In the spectrum thus measured, the relative intensity of the peak corresponding to the peak which is defined as the maximum peak when measuring the spectrum at 25° C. is obtained, and its value is defined as $P_T$.

The wavelength of the irradiating excitation light may be set at any value. However, the result of using the light with the wavelength of 405 nm, e.g. the emission wavelength of the near ultraviolet/ultraviolet LED mainly used as the emitting element of the one chip type white LED illumination is shown in the table 8 and FIG. 12. FIG. 12 is a graph showing the measurement temperature T° C. taken on the abscissa axis, and the relative intensity of the emission intensity taken on the ordinate axis. As described above, the relative intensity of the emission intensity shown on the ordinate axis of the graph according to FIG. 12 is defined as 1.0, with each sample $P_{25}$ as a reference, and the measurement temperature shown on the abscissa axis is set at 25° C., 50° C., 100° C., 150° C., 200° C., 250° C., and 300° C.

From the result shown in the table 8 and FIG. 12, it was found that the phosphors of the sample 5, the sample 21, and the sample 28 were considered to be suitable as the phosphor used in the illumination device, because the deterioration in the emission intensity of the phosphor was suppressed to be small even when the temperature of the phosphor was increased by heat generation of the light emitting part (possibly 100° C. or less in the white LED illumination) and the light emission capable of maintaining high emission intensity and high luminance with small change of color tone could be obtained. Further, temperature characteristics of the sample 21 and the sample 28 containing Al in the constituent element are improved, compared to the temperature characteristics of the sample 5 not containing Al in the constituent element.

1) Preparation of the phosphor

A blue phosphor $SrAlSi_{6.5}O_{1.25}N_{9.5}$:Eu (phosphor of sample 28) was manufactured and prepared by the method explained in the embodiment.

And the green phosphor $Sr_2Al_2Si_{10}ON_{16}$ was manufactured by the following method.

The commercially available $SrCO_3$(2N), AlN(3N), $Si_3N_4$ (3N), and $CeO_2$(3N) were prepared, and each raw material was weighed so that the molar ratio of each element becomes Sr:Al:Si:Ce=0.970:1:5:0.030, and mixed in the atmospheric air by using the mortar. The temperature of the raw materials thus mixed was increased at a temperature increasing rate of 15° C./min up to 1800° C. in a nitrogen atmosphere, with the raw materials in a powdery state, and the raw materials were fired with the temperature maintained at 1800° C. for 3 hours, then the temperature was cooled from 1800° C. to 200° C. for 1 hour, whereby the phosphor of the composition formula $Sr_2Al_2Si_{10}ON_{16}$:Ce was obtained. The sample thus obtained was pulverized and classified.

Also, a red phosphor $CaAlSiN_3$: Eu was manufactured by the following method.

The commercially available $Ca_3N_2$(2N), AlN(3N), $Si_3N_4$ (3N), and $Eu_2O_3$ (3N) were prepared, and each raw material was weighed so that the molar ratio of each element becomes Ca:Al:Si:Eu=0.970:1:1:0.030, and mixed in the glove box under the nitrogen atmosphere by using the mortar. The temperature of the raw materials thus mixed was increased at a temperature increasing rate of 15° C./min up to 1500° C. in the nitrogen atmosphere, and the raw materials were fired with the temperature maintained at 1500° C. for 3 hours, then the temperature was cooled from 1500° C. to 200° C. for 1 hour, whereby the phosphor of the composition formula $CaAlSiN_3$:Eu was obtained. The sample thus obtained was pulverized and classified.

TABLE 7

| | COMPOSITION FORMULA | z/(m + z) | Sr (wt %) | Al (wt %) | Si (wt %) | O (wt %) | N (wt %) | Eu (wt %) | OTHERS (wt %) | AVERAGE PARTICLE SIZE (μm) | SPECIFIC SURFACE AREA (m²/g) |
|---|---|---|---|---|---|---|---|---|---|---|---|
| SAMPLE 5 | $SrSi_7O_{1.25}N_{9.17}$:Eu | 0.030 | 23.9 | | 42.8 | 0.69 | 31.2 | 1.17 | 0.2 | 17.03 | 0.425 |
| SAMPLE 21 | $SrAlSi_{7.0}O_{1.75}N_{9.83}$:Eu | 0.030 | 22.7 | 5.10 | 38.1 | 2.50 | 30.3 | 1.20 | 0.1 | 16.83 | 0.500 |
| SAMPLE 28 | $SrAlSi_{8.5}O_{1.25}N_{9.50}$:Eu | 0.030 | 20.1 | 5.50 | 39.9 | 2.30 | 29.5 | 1.10 | 1.6 | 16.67 | 0.520 |

TABLE 8

| | COMPOSITION FORMULA | z/(m + z) | EXCITATION WAVELENGTH (nm) | RELATIVE EMISSION INTENSITY AT EACH MEASUREMENT TEMPERATURE (TEMPERATURE INCREASING PROCESS) | | | | | | |
|---|---|---|---|---|---|---|---|---|---|---|
| | | | | 25° C. | 50° C. | 100° C. | 150° C. | 200° C. | 250° C. | 300° C. |
| SAMPLE 5 | $SrSi_7O_{1.25}N_{9.17}$:Eu | 0.030 | 405 | 1.00 | 0.94 | 0.79 | 0.60 | 0.37 | 0.18 | 0.07 |
| SAMPLE 21 | $SrAlSi_{7.0}O_{1.75}N_{9.83}$:Eu | 0.030 | 405 | 1.00 | 0.95 | 0.86 | 0.75 | 0.62 | 0.47 | 0.32 |
| SAMPLE 28 | $SrAlSi_{6.5}O_{1.25}N_{9.50}$:Eu | 0.030 | 405 | 1.00 | 0.95 | 0.85 | 0.71 | 0.56 | 0.41 | 0.28 |

Example 7

In an example 7, the phosphor mixture emitting light of the correlated color temperature of 5200K under the excitation of the light emitting element (LED) emitting light with the wavelength of 405 nm was manufactured, and the emission characteristics and the color rendering properties of the phosphor mixture were evaluated.

2) Adjustment of the phosphor mixture

The emission spectrum was measured when each of the three kinds of the phosphors $SrAlSi_{6.5}O_{1.25}N_{9.5}$:Eu, $Sr_2Al_2Si_{10}ON_{16}$:Ce, and $CaAlSiN_3$:Eu was irradiated with the excitation light with the wavelength of 403.5 nm, and such a relative mixing ratio that the correlated color temperature of the phosphor mixture became 5200K was obtained from the emission spectrum by simulation. The simulation result was (SrAlSi$_{6.5}$O$_{1.25}$N$_{9.5}$:Eu):(Sr$_2$Al$_2$Si$_{10}$ON$_{16}$:Ce):(CaAlSiN$_3$:Eu)=31.8:65.2:3.0, and therefore based on the result thus obtained, each phosphor was weighed and mixed, whereby the phosphor mixture was obtained.

However, depending on the emission wavelength (excitation wavelength of the phosphor mixture) of the light emitting part and the emission efficiency of the phosphor by the emission wavelength, a desirable mixing ratio is sometimes deviated from the result of the simulation. In such a case, by properly adjusting the mixing ratio, an actual emission spectrum shape may be arranged.

3) Evaluation by the light emitting element

Figure 13:
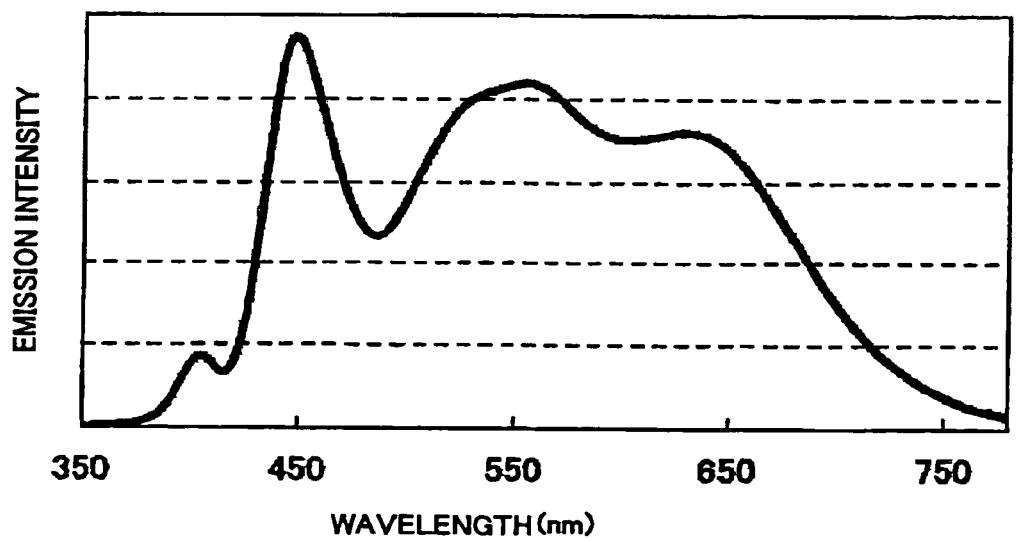
FIG. 13 is a graph showing the emission spectrum of a light emitting device in which a phosphor mixture and a light emitting part are combined.

A mixture of the phosphor mixture and resin was placed on the LED, setting the LED (with emission wavelength of 403.5 nm) of ultraviolet light having a nitride semiconductor as the light emitting part. The mixing ratio of the phosphor and the resin was adjusted to obtain daytime white color corresponding to color temperature of 5200K based on the result, and the white LED illumination (light emitting device) was manufactured by combining with the light emitting part of the LED by the publicly-known method. As a result, the emission spectrum when the light emitting element of the white LED illumination is energized by 20 mA current is shown in FIG. 13. FIG. 13 is a graph showing the relative emission intensity taken on the ordinate axis, and the emission wavelength (nm) taken on the abscissa axis.

According to the phosphor mixture thus described, the white LED illumination could be obtained, which emitted light under the excitation of the ultraviolet light emitted from the light emitting part and released white light having the emission spectrum with a broad peak in the wavelength range from 400 nm to 700 nm. When the color temperature or the chromaticity of the light emission thus obtained was measured, the color temperature was 5193 K, x=0.3402 and y=0.3529. The general color rendering index value (Ra) of the white LED illumination was 91, and the special color rendering index value R9 was 74, R14 was 95, and R15 was 91. Further, by properly changing the blending amount of phosphors and the blending amount of resin to be mixed, emission color having different color temperature could also be obtained.

A list of measurement data of the luminance, chromaticity, color rendering index value, and color temperature or the like of the example 7 is described in table 9.

TABLE 9

| CHROMATICITY | | COLOR RENDERING INDEX | SPECIAL COLOR RENDERING INDEX | | | COLOR TEMPERATURE |
|---|---|---|---|---|---|---|
| x | y | Ra | R9 | R14 | R15 | Tcp(K) |
| EXAMPLE 7 0.3402 | 0.3529 | 91 | 74 | 95 | 91 | 5193 |

What is claimed is:

1. A phosphor which is given as a general composition formula expressed by MmAaBbOoNn:Z, where element M is the element having bivalent valency, element A is the element having tervalent valency, element B is the element having tetravalent valency, O is oxygen, N is nitrogen, and element Z is more than one kind of element acting as an activator, satisfying 5.0<(a+b)/m<9.0, 0≦a/m≦2.0, 0≦o<n, n=(2/3)m+a+(4/3)b−(2/3)o, and having an emission spectrum with a maximum peak wavelength from 400 nm to 500 nm under an excitation of the light in a wavelength range from 350 nm to 430 nm.

2. The phosphor according to claim 1, which is given as the composition formula expressed by 0.0<a/m≦2.0, 4.0≦b/m≦8.0, and 0<o/m<3.0.

3. The phosphor according to claim 1, wherein the element M is more than one kind of element selected from a group consisting of Mg, Ca, Sr, Ba, and Zn, and rare earth elements having bivalent valency, element A is one or more kind of element selected from a group consisting of Al, Ga, In, Tl, Y, Sc, P, As, Sb, and Bi, element B is one or more kind of element selected from the group consisting of Si, Ge, Sn. Ti, Hf, Mo, W, Cr, Pb, Zr, and element Z is more than one kind of element selected from the group consisting of the rare earth elements and transition metal elements.

4. The phosphor according to claim 1, wherein the element M is one or more kind of element selected from a group consisting of Mg, Ca, Sr, Ba, and Zn, the element A is one or more kind of element selected from a group consisting of Al, Ga, and In, the element B is Si and/or Ge, and the element Z is one or more kind of element selected from the group consisting of Eu, Ce, Pr, Th, Yb, and Mn.

5. The phosphor according to claim 1, wherein the element M is Sr, the element A is Al, the element B is Si, and the element Z is Eu.

6. The phosphor according to claim 1, wherein when the general formula is expressed by MniAaBbOoNn:Zz, the value of z/(m+z), which is a molar ratio of the element M to the element Z, is not less than 0.0001 and not more than 0.5.

7. The phosphor according to claim 1, containing Sr of 16.0 to 25.0 wt %, Al of 2.0 to 9.0 wt %, Si of 34.5 wt % to 44.5 wt %, O of 0.5 wt % to 11.5 wt %, N of 23.0 to 32.0 wt %, and Eu of 0 to 3.5 wt %, having an emission spectrum with a maximum peak wavelength in a range from 400 to 500 nm under an excitation of the light in a wavelength range from 350 nm to 430 nm.

8. The phosphor according to claim 1, wherein the phosphor is in a powdery state.

9. The phosphor according to claim 1, containing primary particles having particle size of 20 μm or less, and an aggregate in which the primary particles are aggregated each other, wherein an average particle size (D50) of a phosphor powder containing the primary particles and the aggregate is not less than 1.0 μm and not more than 20.0 μm.

10. A manufacturing method of the phosphor according to claim 1, wherein by using a crucible composed of nitride as a firing crucible, raw materials are fired at temperature of not less than 1600° C. and not more than 2000° C., with one or more kind of gas selected from nitrogen gas, rare gas, and ammonia gas being kept flowing in a furnace at 0.1 ml/min or more.

11. The manufacturing method of the phosphor according to claim 10, wherein the raw materials are fired with pressure in the furnace set at 0.5 MPa or less.

12. The manufacturing method of the phosphor according to claim 10, wherein the crucible composed of nitrogen is a BN crucible.

13. The manufacturing method of the phosphor according to claim 10, wherein carbonate is used as a raw material of an element M.

14. A light emitting device, having the phosphor according to claim 1 and a light emitting part emitting light of a first wavelength and emitting the light from the phosphor having different wavelength from that of the first wavelength, with a part of or all of the light of the first wavelength as an excitation light.

15. The light emitting device according to claim 14, wherein the first wavelength is in a range from 350 nm to 430 nm.

16. The light emitting device according to claim 14, wherein the light emitting part emitting the light of the first wavelength is a light emitting diode (LED).

* * * * *